(12) United States Patent
Al-Deek et al.

(10) Patent No.: US 10,351,131 B2
(45) Date of Patent: Jul. 16, 2019

(54) WRONG WAY VEHICLE DETECTION AND CONTROL SYSTEM

(71) Applicants: UNIVERSITY OF CENTRAL FLORIDA RESEARCH FOUNDATION, INC., Orlando, FL (US); CENTRAL FLORIDA EXPRESSWAY AUTHORITY, Orlando, FL (US)

(72) Inventors: Haitham Al-Deek, Orlando, FL (US); Corey Quinn, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 37 days.

(21) Appl. No.: 15/677,501

(22) Filed: Aug. 15, 2017

(65) Prior Publication Data

US 2018/0050693 A1    Feb. 22, 2018

Related U.S. Application Data

(60) Provisional application No. 62/375,571, filed on Aug. 16, 2016.

(51) Int. Cl.
*B60W 30/09* (2012.01)
*G08G 1/09* (2006.01)
(Continued)

(52) U.S. Cl.
CPC .............. *B60W 30/09* (2013.01); *B60K 35/00* (2013.01); *B60T 7/18* (2013.01); *B60W 10/18* (2013.01);
(Continued)

(58) Field of Classification Search
CPC ............ B60W 30/09; B60W 2550/22; B60W 2710/207; B60W 2550/40;
(Continued)

(56) References Cited

U.S. PATENT DOCUMENTS 4,320,380 A * 3/1982 Berard .................... E01F 13/06
340/935
7,075,427 B1    7/2006 Pace et al.
(Continued)

FOREIGN PATENT DOCUMENTS

KR    20140086084 A * 7/2014

OTHER PUBLICATIONS

U.S. Appl. No. 15/233,186, filed Jul. 29, 2016.
(Continued)

*Primary Examiner* — Rodney A Butler
(74) *Attorney, Agent, or Firm* — Allen, Dyer, Doppelt + Gilchrist, PA

(57) ABSTRACT

A wrong way vehicle countermeasure system may include at least one movement sensor positioned along a roadway and a wireless communications device. The system may further include a controller configured to cooperate with the at least one movement sensor to detect a wrong way vehicle on the roadway, and responsive to the detection of the wrong way vehicle on the roadway by the movement sensor, wirelessly send a countermeasure command to the wrong way vehicle via the wireless communications device to cause the wrong way vehicle to perform at least one wrong way driving countermeasure.

19 Claims, 20 Drawing Sheets

(51) Int. Cl.
G08G 1/16 (2006.01)
B62D 15/02 (2006.01)
B60T 7/18 (2006.01)
B60W 10/18 (2012.01)
B60K 35/00 (2006.01)
G08G 1/04 (2006.01)
G08G 1/07 (2006.01)
G08G 1/095 (2006.01)
B60W 10/20 (2006.01)
G08G 1/017 (2006.01)
G08G 1/056 (2006.01)
G08G 1/00 (2006.01)

(52) U.S. Cl.
CPC ........... *B60W 10/20* (2013.01); *B62D 15/025* (2013.01); *B62D 15/0255* (2013.01); *G08G 1/0175* (2013.01); *G08G 1/04* (2013.01); *G08G 1/056* (2013.01); *G08G 1/075* (2013.01); *G08G 1/095* (2013.01); *G08G 1/162* (2013.01); *G08G 1/167* (2013.01); *G08G 1/205* (2013.01); *B60W 2550/22* (2013.01); *B60W 2550/40* (2013.01); *B60W 2710/182* (2013.01); *B60W 2710/207* (2013.01)

(58) Field of Classification Search
CPC ........... B60W 2710/182; B60W 10/20; B60W 10/18; B62D 15/0255; B62D 15/025; B60K 35/00; B60T 7/18; G08G 1/095; G08G 1/075; G08G 1/04; G08G 1/205; G08G 1/0175; G08G 1/162; G08G 1/056; G08G 1/167
See application file for complete search history.

(56) References Cited

U.S. PATENT DOCUMENTS

| | | | |
|---|---|---|---|
| 8,188,887 B2 | 5/2012 | Catten et al. | |
| 8,849,554 B2 | 9/2014 | Aubrey et al. | |
| 9,251,707 B2 | 2/2016 | Kugel et al. | |
| 9,640,072 B2 | 5/2017 | White | |
| 2015/0127190 A1* | 5/2015 | Fuehrer | B60W 30/09 701/1 |
| 2015/0356871 A1* | 12/2015 | Kugel | G01C 21/3697 340/935 |
| 2016/0210855 A1* | 7/2016 | Jeschke | G08G 1/04 |
| 2017/0018178 A1* | 1/2017 | Poechmueller | G08G 1/056 |
| 2018/0218608 A1* | 8/2018 | Offenhaeuser | G08G 1/162 |

OTHER PUBLICATIONS

Texas Transportation Institute "Assessment of the Effectiveness of Wrong Way Driving Countermeasures and Mitigation Methods" Tti.tamu.edu. Texas Dept. of Transportation, Dec. 2014. Web. Accessed on Apr. 11, 2016. http://d2dtl5nnlpfr0r.cloudfront.net/tti.tamu.edu/documents/0-6769-1.pdf. pp. 172.
Hakkert et al. "An evaluation of crosswalk warning systems: effects on pedestrian and vehicle behaviour" Transportation Research Part F. 5 (2002) 275-292. Abstract Only.
TAPCO "Lane Light In-Road Warning Lights" TAPCO Safe Travels. TAPCO, Web. Accessed on Jul. 28, 2016. http://www.tapconet.com/solar-led-division/in-road-warning-lights; pp. 3.
Bayerische Motoren Werke (BMW) Automotive Group. Advance warning of drivers heading in the wrong direction the "wrong-way driver" information. Press Release, 2007. Web. Accessed on May 6, 2016. https://www.press.bmwgroup.com/pressclub/p/pcgl/pressDetail.html?utputChannelId=6&id=T0012266EN&left_menu_item=node_2374. pp. 2.
Corey Quinn "Wrong-Way Driving Detection and Prevention System: A Pilot Deployment" Transportation Research Board 94th Annual Meeting Jan. 11-15, 2015; pp. 20.
Finley et al. "Conceptual design of a connected vehicle wrong-way driving detection and management system" Texas A&M Transportation Institute: Report 0-6867-1; Apr. 2016. pgs.
Grothues, Harry, "2012 ITS Texas Annual Meeting: Session 5B V2V and V2I Implementations: Connected Vehicle Wrong-Way Driver Countermeasures" SwRl. Dallas, TX. Oct. 26, 2012. PowerPoint Presentation; pp. 11.
Haitham Al-Deek "Wrong-Way Driving (WWD): Statistical Trends, Innovative Research Approach, and New Countermeasures to Combat WWD Events on Limited Access Highways" Workshop at the 7thTraffic Safety Conference: Amman, Jordan May 11, 2015; pp. 124.
Liu et al. "Vision-Based Stop Sign Detection and Recognition System for Intelligent Vehicles" Transportation Research Record: Advanced Traffic Management Systems and Vehicle-Highway Automation 1748 (2001): 161-166. Abstract Only.
Ni et al. "Development of a Conceptual Framework toward an Integrated Transportation System" New England University Transportation Center Final Report: Nov. 30, 2009; pp. 29.
Rogers et al. "Wrong-Way Driving Incidents on Central Florida Toll Road Network, Phase-1 Study: An Investigation into the Extent of this Problem?" presented at the 2nd Transportation and Development Institute, ASCE, Jun. 8-11, 2014 in Orlando, Florida. http://ascelibrary.org/doi/abs/10.1061/9780784413586.032 Abstract Only.
Rogers, Jr. et al. "Wrong-way driving on Florida toll roads: an investigation into multiple incident parameters and targeted countermeasures for reductions" Int. J. Engineering Management and Economics, vol. 5, Nos. 3/4. 2015: pp. 144-168.
Saetem, Lai T. "Wrong-Way Driving Prevention Methods.fl Caltrans Division of Research, Innovation and System Information" Caltrans, 2015. Web. Accessed on Apr. 11, 2016. http://www.dot.ca.gov/newtech/researchreports/preliminary_investigations/doc/wrong-way_driving_prevention_methods_preliminary_investigation.pdf. pp. 8.
Sandt et al. "Wrong-way driving prevention: incident survey results and planned countermeasure implementation in Florida" Transportation Research Record: Journal of the Transportation Research board. No. 2484: 2015; pp. 99-109.
SES America. "Blank Out Signs" SESA. Web, 2016. Accessed on May 9, 2016. http://sesamerica.com/product/blank-out-signs/. pp. 4.
Toyota. "2013 Lexus LS Advanced Active Safety Features 2013 Consumer Electronics Show" Toyota/Lexus. 2013. Web. Accessed on Apr. 11, 2016. http://www.toyota.com/esq/pdf/The%202013%20LS%20Advanced%20Active%20Safety%20(2).pdf. pp. 6.
White et al. "Algorithm for Predicating Inattentive Signal Violators in an Infrastructure-Based Intelligent System." Transportation Research Record: Intelligent Transportation Systems and Vehicle-Highway Automation 1886 (2004): 85-91. Abstract Only.
Wu, Hao, et al. "Efficiency of Simulated Vehicle-to-Vehicle Message Propagation in Atlanta, Georgia, I-75 Corridor" Transportation Research Record: Intelligent Transportation Systems and Vehicle-Highway Automation 1910 (2005): 82-89. Abstract Only.

* cited by examiner

WRONG WAY VEHICLE DETECTION AND CONTROL SYSTEM

RELATED APPLICATIONS

This application claims the benefit of provisional application Ser. No. 62/375,571 filed Aug. 16, 2016, which is hereby incorporated herein in its entirety by reference.

TECHNICAL FIELD

The present disclosure generally relates to the field of vehicle traffic monitoring systems, and more particularly to systems and devices which may be used for detecting wrong way drivers and mitigating accidents based thereon.

BACKGROUND

Wrong way driving (WWD) is a hazardous result of driver error/behavior especially if it occurs on high speed roadways, such as limited access facilities including turnpikes or expressways. WWD may result in head-on collisions on the mainlines of limited access facilities. These collisions often cause severe injuries and even fatalities. The contributing causes for WWD driver error can vary and include driver intoxication and confusion. Typically, these crash occurrences are documented and recorded by law enforcement officers and are available to engineering staff to later evaluate for safety analysis.

There are also many WWD incidents that do not result in a crash. Some of these wrong way drivers are stopped by law enforcement and issued a pertinent citation, but in some cases, the drivers are not intercepted. Other roadway users may report WWD events to emergency response personnel, such as a 911 computer aided dispatch (CAD) call center. In other cases, there might be no report of the WWD event and the WWD drivers might correct their direction of travel on their own or exit the limited access facility in the wrong direction.

When WWD crashes occur on limited access facilities, these events usually make news headlines and strike fear into those who use these high-speed roadways. A right way driver on the mainline can take little action to avoid a WWD vehicle, since the approach rates of both vehicles combine for an excessive rate of speed (65 mph+65 mph=130 mph).

According to the National Transportation Safety Board (NTSB), only about 3% of crashes that occur on high-speed divided highways are caused by WWD (NTSB, 2012). Although WWD crashes are rare, the consequences can be severe. Therefore, it is important to try to reduce the occurrence of these crashes as much as possible.

SUMMARY

A wrong way vehicle countermeasure system may include at least one movement sensor positioned along a roadway and a wireless communications device. The system may further include a controller configured to cooperate with the at least one movement sensor to detect a wrong way vehicle on the roadway, and responsive to the detection of the wrong way vehicle on the roadway by the movement sensor, wirelessly send a countermeasure command to the wrong way vehicle via the wireless communications device to cause the wrong way vehicle to perform at least one wrong way driving countermeasure.

By way of example, the wrong way vehicle may include a Lane Keeping Assist System (LKAS), and the countermeasure command may be an LKAS command to steer the wrong way vehicle to the side of the roadway. In accordance with another example, the wrong way vehicle may include a braking system, and the countermeasure command may be a force stop command to cause the wrong way vehicle to actuate the braking system. In one example embodiment, the vehicle may include a Heads-Up Display (HUD), and the countermeasure command may be a display warning command to cause the HUD to display a wrong way driving warning message.

In accordance with an example embodiment, the at least one movement sensor may include a first movement sensor positioned along an off ramp of a mainline roadway to detect movement of the wrong way vehicle along the off ramp, and a second movement sensor positioned along the mainline roadway before the off ramp. As such, the controller may be further configured to cooperate with the second movement sensor to detect a right way vehicle approaching the off ramp along the mainline roadway and, responsive thereto, wirelessly send a countermeasure command to the right way vehicle to cause the right way vehicle to also perform at least one wrong way driving countermeasure.

The system may further include a wrong way indication sign facing away from a direction of oncoming traffic on the roadway, with the at least one movement sensor being adjacent the wrong way indication sign, and at least one beacon adjacent the wrong way indication sign. Moreover the controller may be configured to cause the at least one beacon to flash responsive to the detection of the wrong way vehicle by the at least one movement sensor. In addition, the at least one movement sensor may include a forward facing movement sensor adjacent the wrong way indication sign and facing away from the direction of oncoming traffic on the roadway, and a rear facing movement sensor adjacent the wrong way indication sign. In one example embodiment, the at least one beacon may include an upper pair of flashing beacons above the wrong way indication sign, and a lower pair of flashing beacons positioned below the wrong way indication sign.

A wrong way vehicle countermeasure method is also provided for use with at least one movement sensor positioned along a roadway and a wireless communications device. The method may include operating the at least one movement sensor to detect a wrong way vehicle on the roadway, and responsive to the detection of the wrong way vehicle on the roadway by the movement sensor, wirelessly sending a countermeasure command to the wrong way vehicle via the wireless communications device to cause the wrong way vehicle to perform at least one wrong way driving countermeasure.

A related non-transitory computer-readable medium is for a computer for use with at least one movement sensor positioned along a roadway and a wireless communications device. The non-transitory computer-readable medium may have computer-executable instructions for causing the computer to perform steps including operating the at least one movement sensor to detect a wrong way vehicle on the roadway, and responsive to the detection of the wrong way vehicle on the roadway by the movement sensor, wirelessly sending a countermeasure command to the wrong way vehicle via the wireless communications device to cause the wrong way vehicle to perform at least one wrong way driving countermeasure.

DESCRIPTION

This present disclosure relates to a system for stopping "intentional" wrong way drivers (e.g., suicidal, intoxicated) or unintentional drivers (e.g., confused or disoriented) from proceeding to a mainline roadway (e.g., from an exit ramp or intersection) and endangering right way drivers. The system may also notify right way drivers on the mainline from the approaching wrong way driver, e.g., on the exit ramp.

Further details of an example rectangular rapid flashing beacon (RRFB) system which may be used in in the above-described configurations are now described with respect to FIGS. 1-8. Additional details may also be found in U.S. patent application Ser. No. 15/223,186 filed Jul. 29, 2016, which is hereby incorporated herein in its entirety by reference.

Figure 1:
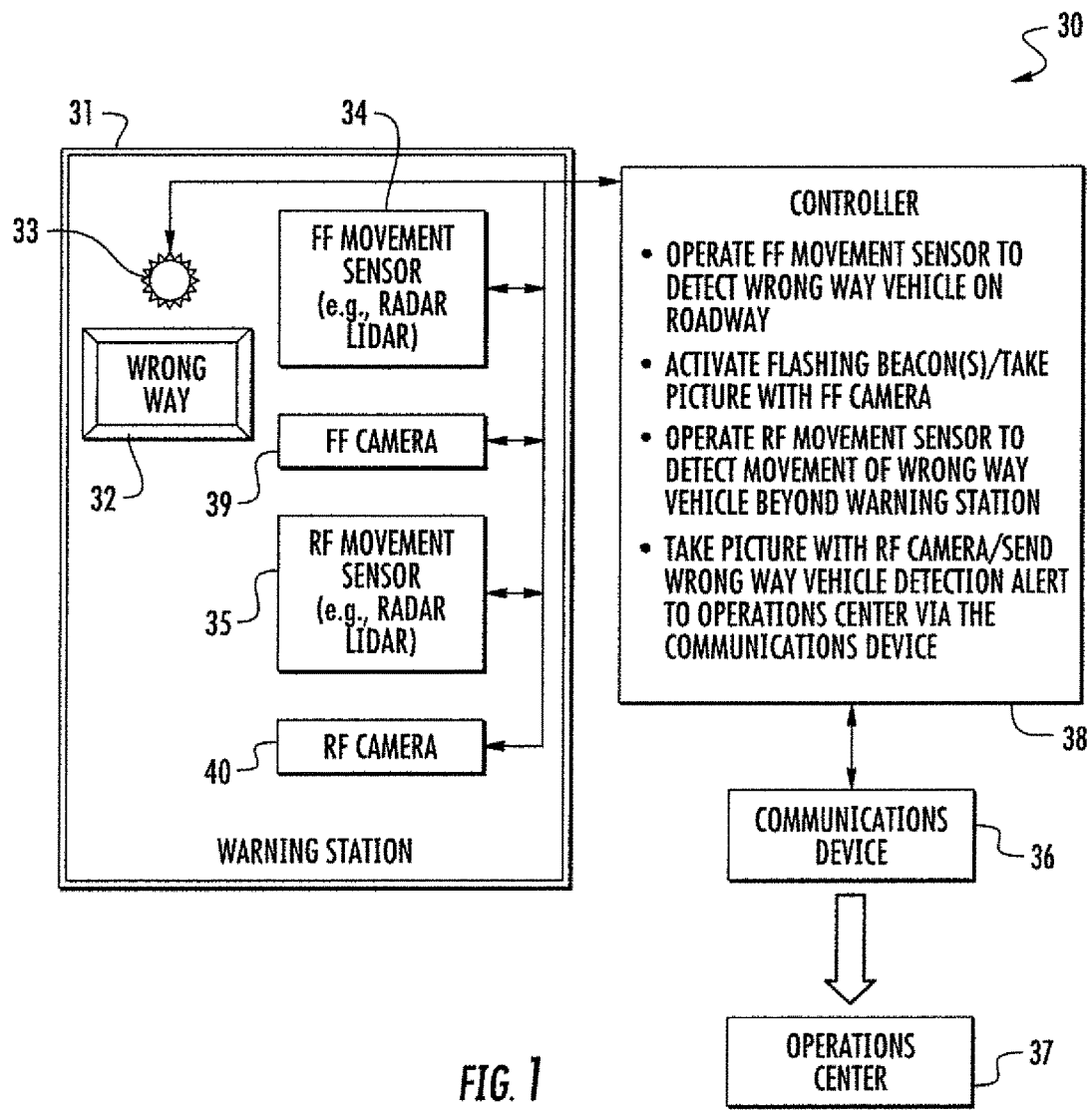
FIG. 1 is a schematic block diagram of a wrong way vehicle detection system in accordance with an example embodiment.
Figure 2:
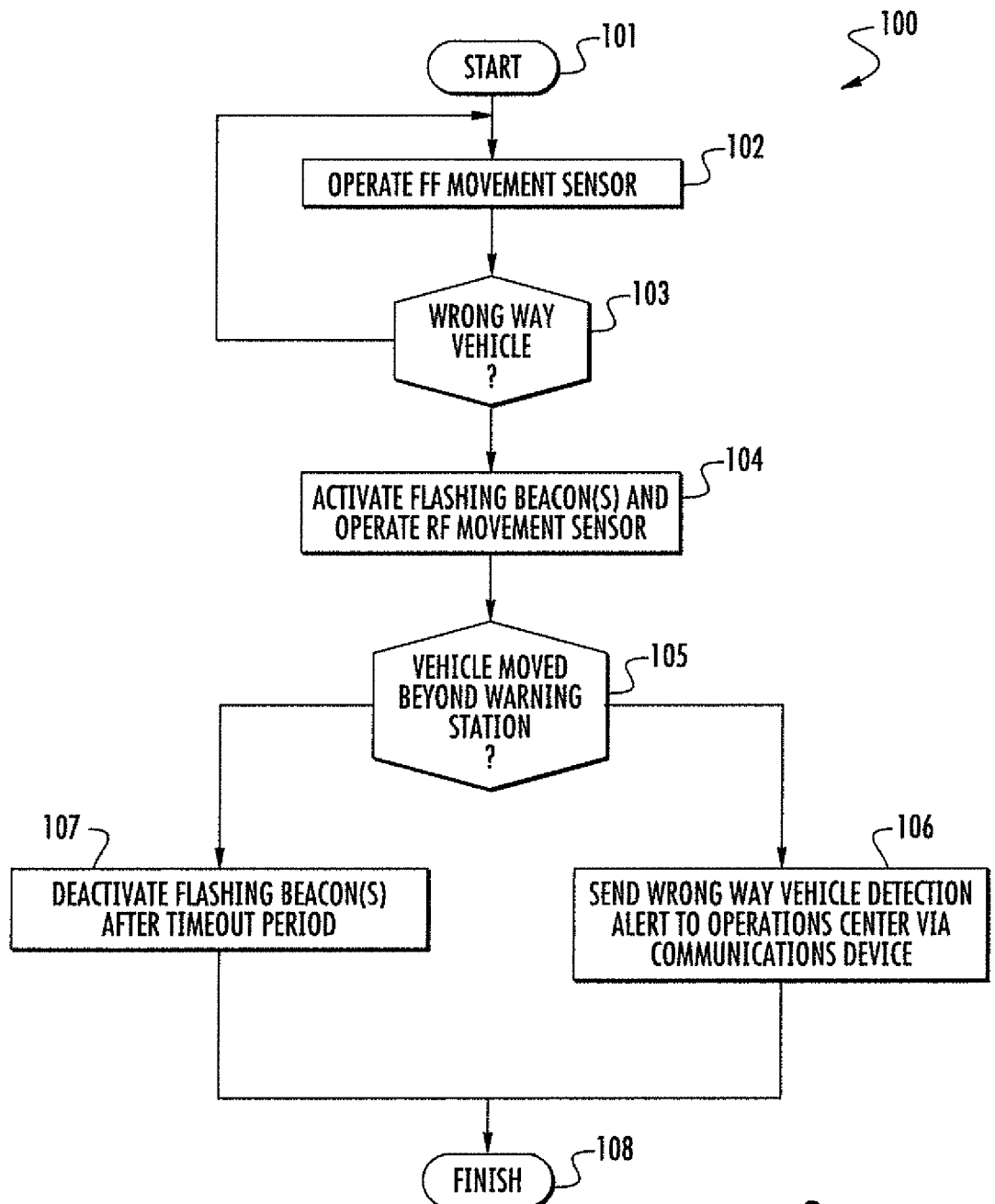
FIG. 2 is a flow diagram illustrating method aspects associated with the system of FIG. 1.

Turning initially to FIG. 1 and the flow diagram 100 of FIG. 2, a wrong way vehicle detection system 30 and related operational aspects are first described. The system 30 illustratively includes a warning station 31 positioned along a roadway. The warning station 31 may take various forms, in that the various components thereof may be mounted on a signpost(s) or other structure(s) on the roadside, a building (such as a toll both), etc., or combinations thereof. Generally speaking, the warning station 31 may include a wrong way indication sign 32 facing away from a direction of oncoming traffic on the roadway. The sign 32 may have different warning messages in different applications, such as "wrong way", "do not enter", and/or "keep out", for example, and may be in different languages, fonts, colors, and/or shapes.

The warning station 31 further illustratively includes one or more flashing beacons 33 adjacent the wrong way indication sign 32. By way of example, the beacon 33 may include an incandescent or LED light, which may be in various shapes (e.g., circular, rectangular, etc.), colors (e.g., red, white, yellow, etc.), sizes, and configurations. Certain example beacon configurations are discussed further below.

The warning station 31 also illustratively includes a forward facing (FF) movement sensor 34 and a rear facing (RF) movement sensor 35 adjacent the wrong way indication sign 32. The forward facing movement sensor 34 faces away from the direction of oncoming traffic on the roadway, while the rear facing movement sensor 35 faces in a direction so that it may detect when a wrong way vehicle moves past or beyond the warning station 31. Stated alternatively, the forward facing movement sensor 34 is oriented to face a wrong way vehicle as it approaches the warning station 31, while the rear facing movement sensor 35 is oriented across the roadway or at least partially behind the warning station. Various types of movement sensors may be used, such as radar, laser (e.g., LIDAR), infrared, or other suitable sensors, for example. More particularly, example wireless sensors which may be used with the system 30 include the MicroRadar sensor from Sensys Networks, Inc., and the SmartSensor HD from Wavetronix L.L.C., although other suitable sensors may also be used. In some embodiments, combinations of different types of sensors may be used to help guard against false positives or leverage the abilities of different types of sensors to operate better in different weather conditions (e.g., sun, rain, snow, etc.).

The system 30 further illustratively includes a communications device 36, which may be used to communicate with an operations or traffic management center 37, for example. The operations center 37 may be managed by a private or government roadway department (e.g., an expressway authority, department of transportation, law enforcement, etc.) which may monitor information from the system 30 and dispatch responders accordingly. In accordance with one example embodiment, the communications device 36 may be a cellular communications device which communicates with the operations center 37 over a cellular network, e.g., via text messages. However, in other embodiments the communications device 36 may operate over other types of wireless networks, or if the infrastructure is available at the given location, it may communicate over a hardwired (e.g., fiber optic, etc.) connection to a communications network.

The system 30 also illustratively includes a controller 38 which cooperates with the warning station 31 and the communications device 36 to perform various operations. By way of example, the controller 38 may be implemented using appropriate hardware (e.g., microprocessor, etc.) and an associated non-transitory computer-readable medium having computer-executable instructions for causing the hardware to perform the various operations. Beginning at Block 101, the controller 38 may be configured to operate the forward facing movement sensor 34 to detect a wrong way vehicle on the roadway, at Block 102. For example, the forward facing movement sensor 34 may be operated or activated on a periodic basis or at specified intervals (e.g., one or more times per second) so that when a wrong way vehicle enters its sensing area the wrong way vehicle is detected. The interval at which the forward facing movement sensor 34 is activated may be determined based upon the expected speed at which a wrong way vehicle will approach the warning station 31. Power consumption may be another factor to consider when setting the frequency of operation of the forward facing movement sensor 34 when operating off of battery power. In this regard, the various components of the system 30 may be operated solely off of solar power in some embodiments, although power from a power grid may also be used where available (and in some configurations both types of power sources may be used).

Responsive to a detection of the wrong way vehicle on the roadway by the forward facing movement sensor 34 at Block 103, the controller 38 may accordingly activate the flashing beacon(s) 33 (Block 104) and operate the rear facing movement sensor 35 to detect if the wrong way vehicle moves beyond the at least one warning station 31. When it is detected that the wrong way vehicle has moved beyond the warning station, at Block 105, the controller 38 may accordingly send a wrong way vehicle detection alert to the operations center 37 via the communications device 36, at Block 106, so that the police or other appropriate personnel may be dispatched to stop the wrong way driver. In accordance with one example embodiment, traffic device monitoring software such as BlinkLink™ from Traffic & Parking Control Co., Inc. of Brown Deer, Wis. may be configured to provide such a notification to a traffic control center, although other suitable approaches may also be used. In some embodiments, other optional countermeasures may be deployed to stop the wrong way driver from proceeding at this point, e.g., the controller 38 could activate tire disabling devices, barriers, or gates that come down across the roadway as appropriate for the given implementation.

On the other hand, if there is no detection of the wrong way vehicle going beyond the warning station 31 after a timeout period, then it may be presumed that the vehicle turned around responsive to the flashing beacon 33 and is no longer continuing in the wrong direction along the roadway. As such, the flashing beacon 33 may be deactivated and the system "reset" for the next occurrence of a wrong way driver, at Block 107. The method of FIG. 2 illustratively concludes at Block 108.

In the example illustrated in FIG. 1, the system 30 further illustratively includes an optional forward facing camera 39 and an optional rear facing camera 40 adjacent to the wrong way indication sign 32 and coupled to the controller 38. As such, the controller 38 may further cause the forward facing camera 39 to take a picture(s) responsive to the forward facing movement sensor 34 detecting the wrong way vehicle on the roadway. That is, when the wrong way vehicle is first detected by the forward facing movement sensor 34, a picture of the vehicle is also taken. Generally speaking, the field of view of the camera 39 may be aligned with or at least partially overlap the area covered by the sensor 34. Similarly, the controller 38 may also cause the rear facing camera 40 to take a picture(s) responsive to the rear facing movement sensor 40 detecting movement of the wrong way vehicle beyond the warning station 31. Here again, the field of view of the rear facing camera 40 may at least partially overlap with the area covered by the sensor 35 to help ensure that the vehicle is within the field of view of the camera when the picture is taken. One or both of the pictures taken by the forward facing and rear facing cameras 39, 40 may also be communicated to the operations center 37 via the controller 38 and communications device 36. Moreover, more than one picture may be taken (e.g., a plurality of rapid succession pictures), and in some embodiments the "picture" may be a video.

Figure 3:
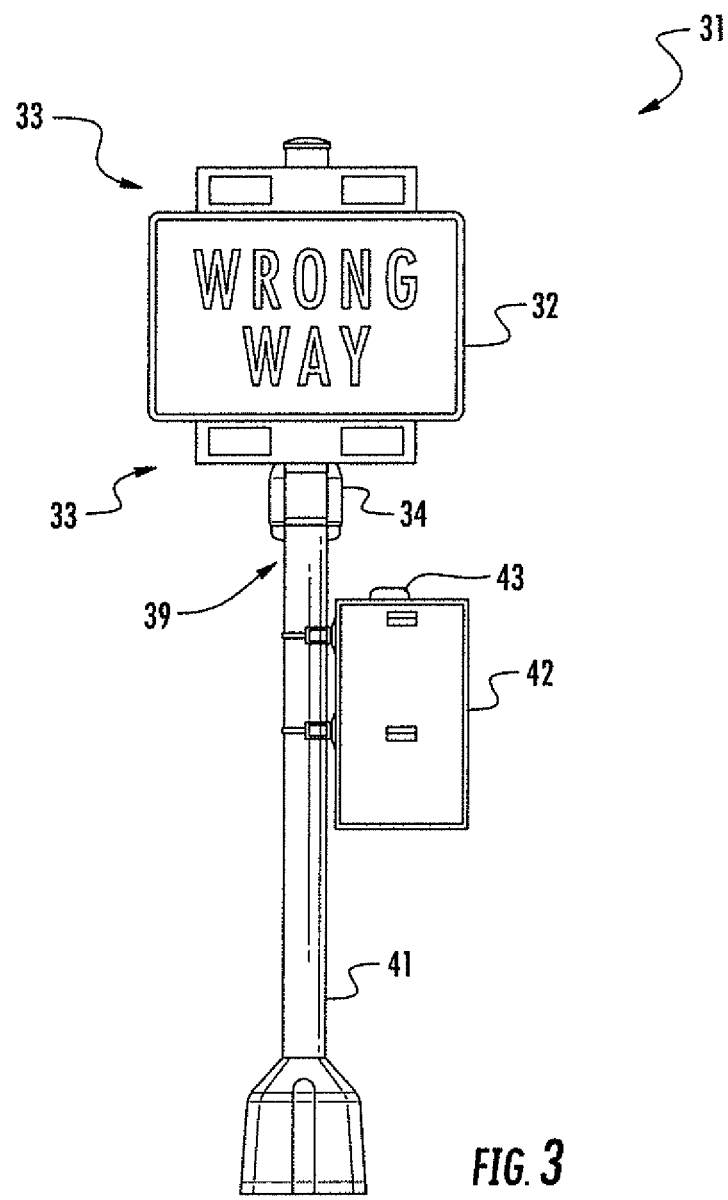
FIG. 3 is a front view of an example warning station which may be used with the system of FIG. 1.

Turning to FIG. 3, an example embodiment of a warning station 31 which is implemented on a sign pole 41 is now described. A housing or cabinet 42 is mounted on the post 41, which may be used to house the controller 38, cellular modem, and a primary or backup battery, for example. Moreover, a cellular modem antenna 43 is mounted on the exterior of the housing 42, although it may be mounted elsewhere (e.g., at the top of the sign pole 41) in other configurations.

Moreover, in the illustrated example the warning station 31 further illustratively includes upper and lower pairs of flashing beacons 33 positioned above and below the wrong way sign 32, although in some embodiments just the upper or lower pair of flashing beacons may be used (or more than two lights may be included in the beacon arrays). In this configuration, the flashing beacons 33 are referred to as rectangular rapid flashing beacons (RRFBs), which are designed to attract the attention of wrong way drivers better than existing LED configurations.

By way of example, the RRFB may be used at exit ramps of limited access highways (e.g., toll roads and turnpikes), high speed roads, or other places where there is potential for wrong way driving events to occur. In the illustrated configuration, the lights of the upper and lower flashing beacons 33 are operated out of phase with respect to one another. That is, the left light of the upper flashing beacon illuminates at the same time as the right light of the lower flashing beacon, and vice-versa. Moreover, the frequency of operation of the lights may be in a range of about 55 to 65 flashes per minute (FPM), and more particularly about 60 FPM, for example, although other frequencies may also be used. Moreover, a wig wag pattern with a 50% duty cycle flash pattern may also be used in some embodiments. A research study was conducted for the illustrated RRFB configuration in the above-described frequency range found that 75% of the respondents found the RRFB with alternating high frequency flashing lights to be better (i.e., more noticeable) than comparable pairs of LEDs flashing at the same time after watching videos of both. Other warning features may also be added at a warning station, such as a reflective (e.g., red) strip on the sign post 41, for example.

Figure 4:
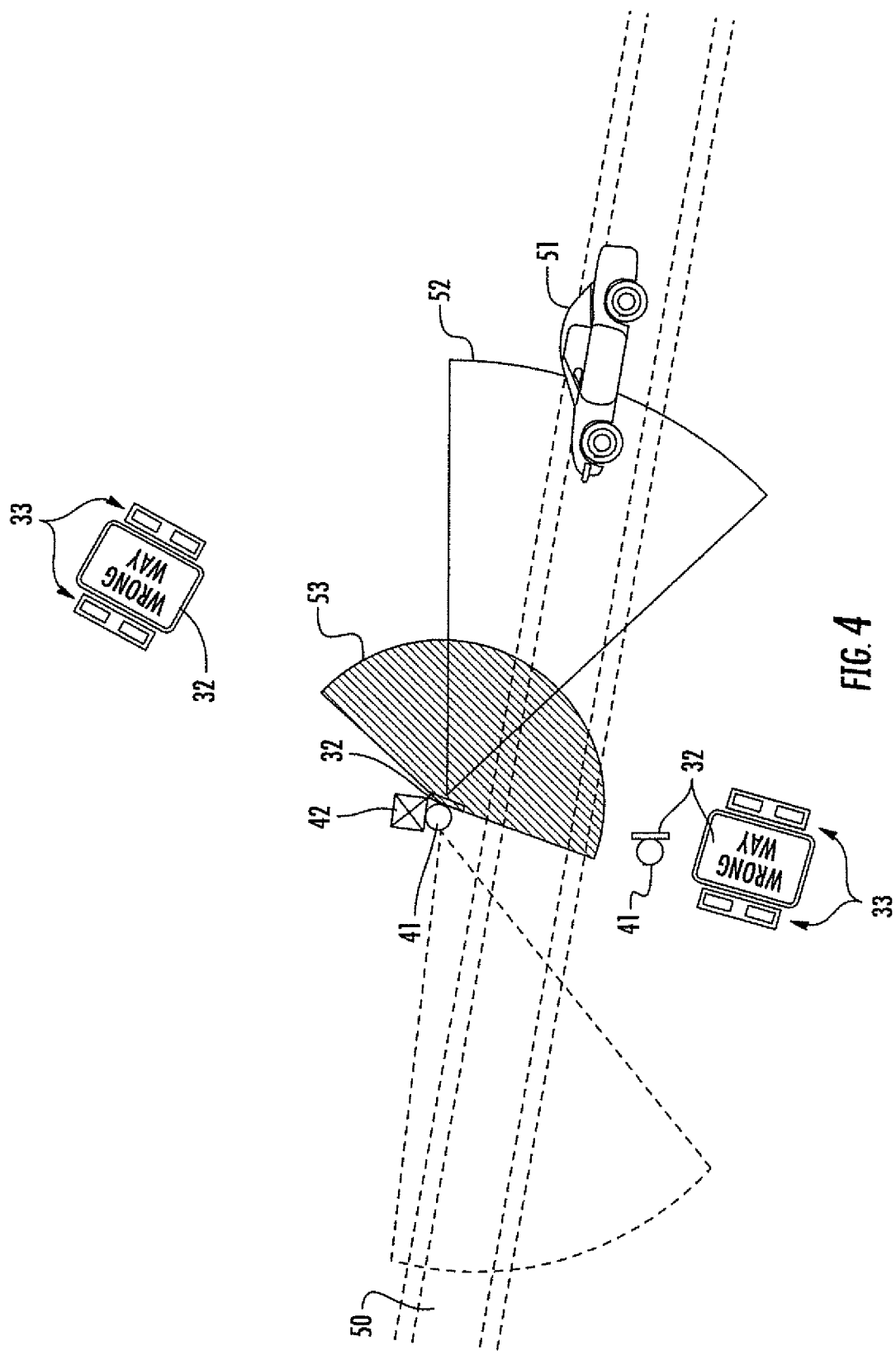
FIGS. 4-6 are a series of schematic diagrams illustrating an example implementation of the system of FIG. 1 on an off ramp of a roadway.
Figure 5:
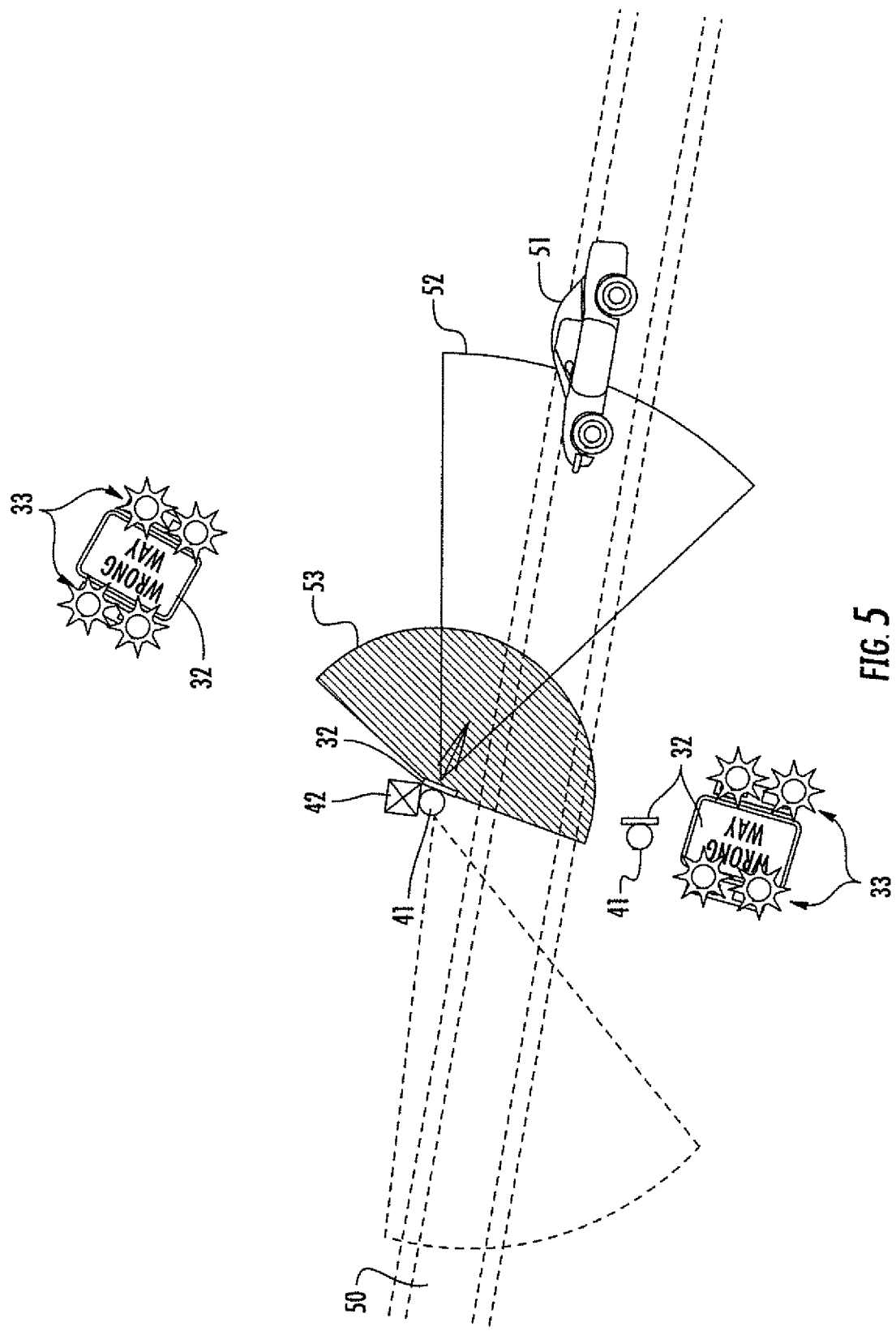
Figure 6:
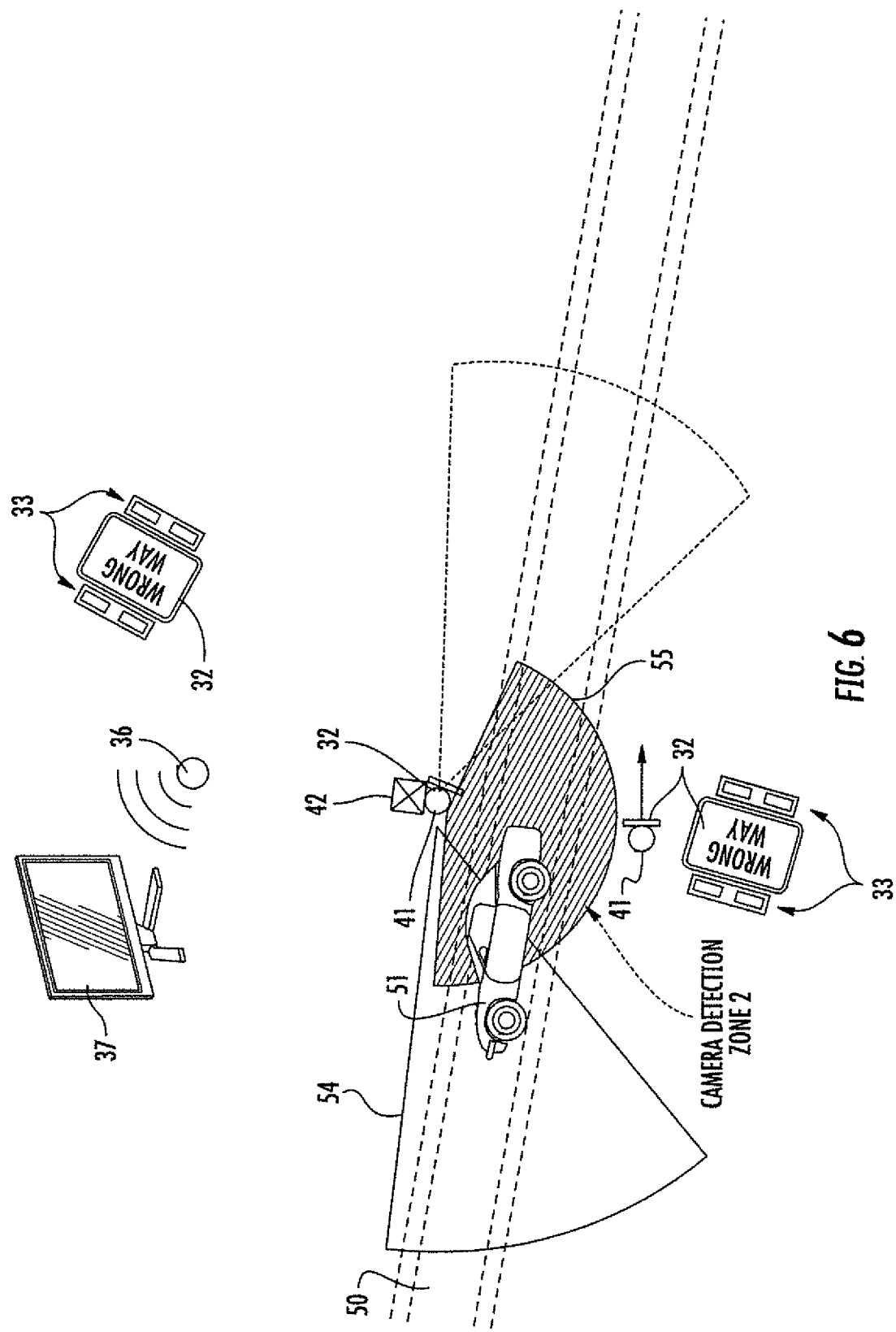

Referring now to FIGS. 4-6, an example use case is now described where a pair of the warning stations 31 each with respective upper and lower RRFBs are positioned on opposite sides of an off ramp or exit ramp 50 to a roadway (e.g., an expressway, turnpike, highway, etc.). In this configuration, both of the warning stations need not include all of the components described above. For example, one of the warning stations may simply include the sign post 41, wrong way sign 32, and the upper and lower flashing beacons 33, which may be activated by the controller 38 and forward facing movement sensor 34 of the other warning station. The camera and communications functions may also be handled by the other warning station as well. In some embodiments, some of the components may be mounted on one of the sign posts 41 and other components may be mounted on a different sign post 41. For example, the forward facing movement sensor and forward facing camera 39 may be mounted on one of the sign posts 41, and the rear facing movement sensor 35 and rear facing camera 40 may be mounted on the other sign pole. In other words, reference to a "warning station" herein may be to a single pole or object to which all of the above-noted components are mounted, or to multiple poles or objects with the above-noted components distributed between them. Of course, in some implementations, the same components may be installed on multiple sign poles 41 or other objects (e.g., multiple movement sensors to provide a wider sensing area, multiple cameras to provide different camera angles, etc.).

In the present example, a wrong way vehicle 51 enters the off-ramp 50 from the wrong direction (i.e., from the end of the off-ramp). When the wrong way vehicle 51 enters the first detection zone 52 of the front-facing movement sensor 34 (here a radar sensor), the vehicle is detected and a confirmation photo(s) of the vehicle is optionally taken within the first camera detection zone 53 to verify that the sensor detection was not a false positive, and/or to help identify the vehicle. As shown in FIG. 5, detection of the wrong way vehicle 51 in the zone 52 causes the controller 38 to activate the RRFBs, which in some cases will be sufficient to cause the driver to realize he or she is going the wrong way and turn around. However, in those cases where the driver continues to go the wrong way up the off ramp 50, the vehicle 51 will subsequently enter the second radar detection zone 54 of the rear facing sensor 35, triggering an alert to be sent to the operations center 37 and further causing the rear facing camera 40 to take another picture(s) of the vehicle 51 within the second camera detection zone 54.

Figure 7:
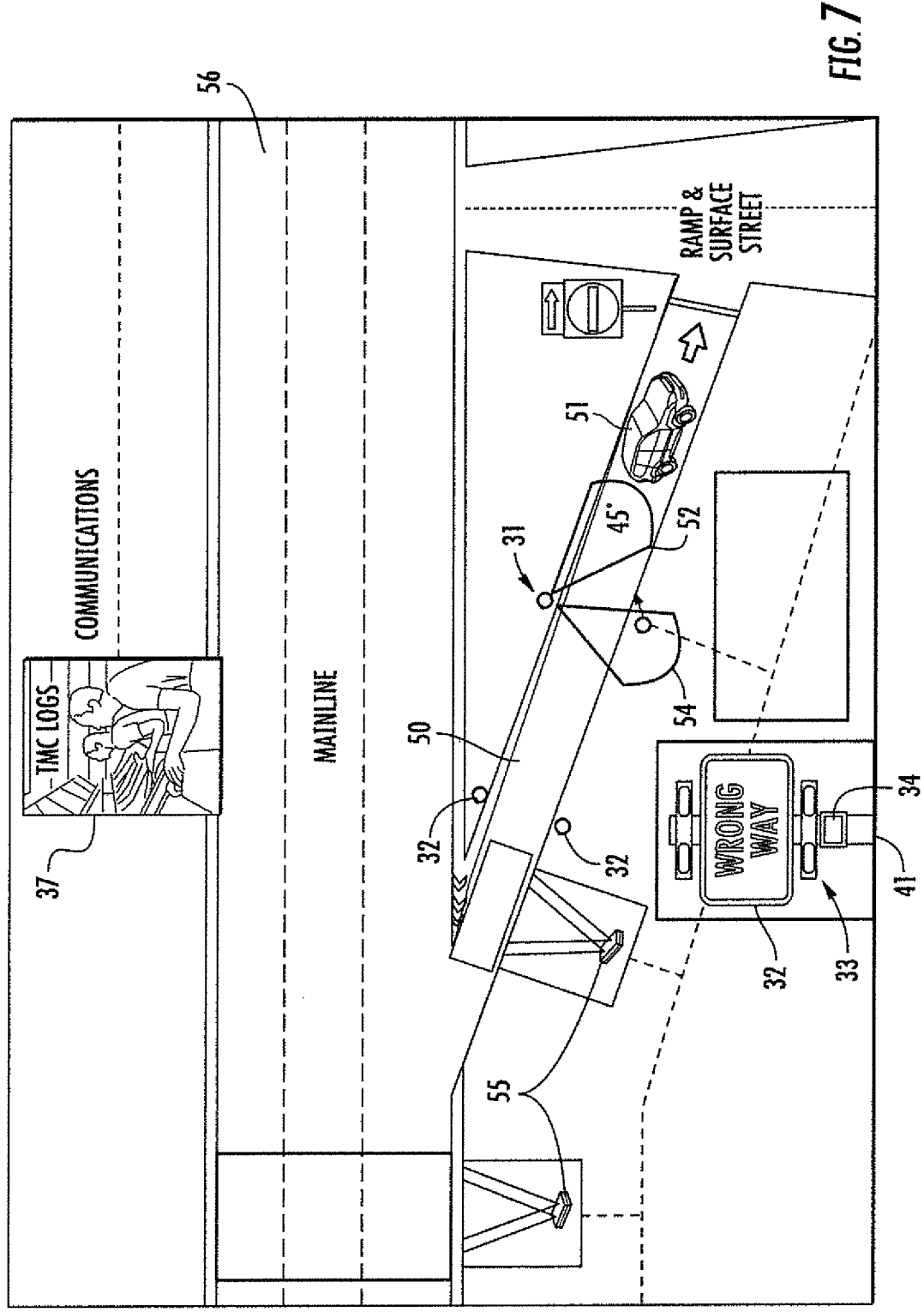
FIG. 7 is a schematic block diagram illustrating another example implementation of the system of FIG. 1 on an off ramp of a limited access roadway.

Still another example configuration is shown in FIG. 7, in which there are multiple sets of wrong way signs 32 positioned along the off ramp 50 of a mainline roadway 56. More particularly, the wrong way signs 32 of the first set are positioned approximately half way up the off ramp 50 on opposite sides thereof, while the wrong way signs of the second set are positioned closer to the beginning of the off ramp. Applicants theorize, without wishing to be bound thereto, that the effectiveness of the warning stations 31 may increase significantly by doubling the number of signs/beacons as shown. Additional signs/beacons may also be used, depending on the given location. In addition, in the present example additional motion sensors 55 are positioned at the beginning of the off ramp 50 and along the mainline roadway 56 just upstream from the off ramp entrance to provide still further certainty that the wrong way vehicle 51 has entered the roadway.

Figure 8:
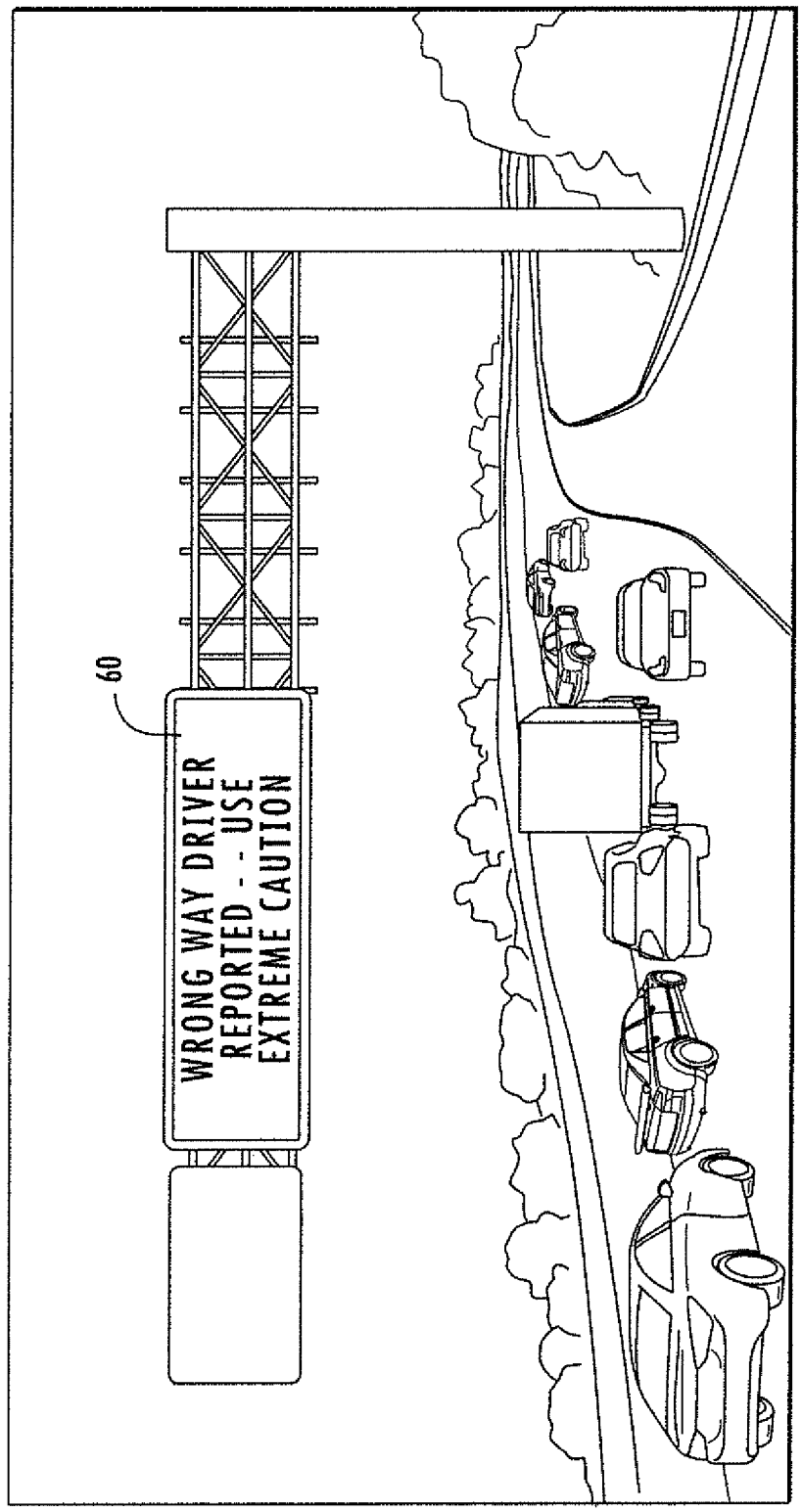
FIG. 8 is a perspective view of an electronic message board which may be used with the system of FIG. 1 to display a wrong way driver warning message in accordance with an example embodiment.

Referring additionally to FIG. 8, in some embodiments the system may further include one or more electronic message boards 60 (aka dynamic message signs or DMSs) positioned along the roadway which may be used to display various messages to oncoming traffic (i.e., right-way drivers). Responsive to a detection that a wrong way vehicle has gone beyond the warning station 31 and is about to enter (or has entered) the roadway, one or more electronic message boards 60 may be configured to then display a wrong way warning message to oncoming traffic. This may be done automatically responsive to the wrong way vehicle detection alert from the controller 38, and may be mapped only to the appropriate electronic message board(s) 60 on the roadway (e.g., only the electronic message board(s) immediately upstream from the off ramp where the wrong way driver was detected will display the message, and not electronic message boards facing the other direction along the roadway, for example. More particularly, the warning message may be mapped to those DMSs within a given number of miles upstream from the location where the wrong way vehicle detection occurred.

The number and manner in which the electronic message boards 60 are used to display the warning message may be different in other embodiments. For example, in the example illustrated in FIG. 8, a large overhead DMS is shown which is mounted over the mainline, but such signs are very expensive and therefore may be used sparingly along a roadway system. In other embodiments, smaller DMSs may be used in addition to, or instead of, the larger overhead DMSs. For example, the smaller DMSs may be positioned on posts alongside of the mainline (or on both sides), on toll booths, etc. In any event, use of overhead and/or small DMSs integrated with the above-described systems may accordingly provide an enhanced level of safety with the above-described RRFB technology, in that you first try to make the wrong way drivers turn around, and secondly inform the right way drivers about the imminent danger of a wrong way driver.

In addition to (or instead of) DMSs, other automated driver alert approaches for notifying right way drivers of an approaching wrong way vehicle after detection by the systems described above may also be used. For example, such approaches may include smart phone apps, Bluetooth, or other mobile device communications. For example, similar to the way in which the wrong way warning message may be mapped to roadside DMSs as described above, such a warning may similarly be provided to a navigation app such as Google Maps, Apple Maps, and Waze. Thus, right way drivers using such an app may receive an indicator on their mobile device or in-car display when they enter the area "upstream" of where a wrong way driver was detected. Similarly, such apps may be used to provide an audible and/or visual alert when danger from a wrong way driver is imminent, similar to an Amber or silver warning alert, for example. Such an alert may be provided even if the app is not currently being used by a right way driver (i.e., the warning may be detected through background operation of the app).

In some embodiments, an additional camera(s) may be added to the system to help further determine when drivers turn around as a result of recognizing they are driving the wrong way, or in the alternative that the wrong way vehicle actually entered onto a mainline road. For example, this may be particularly helpful at an off ramp to a mainline, such as described above, with the additional camera positioned at the end of the off ramp (i.e., where the mainline and the off ramp meet) and connected to the system controller to provide pictures back to the operations center. Verification of a wrong way driver turning around may be extremely useful, as it can save the time of law enforcement going after the wrong way driver if they just turn around in time and correct their action. On this other hand, this may also provide a final confirmation that the wrong way vehicle in fact entered the high speed mainline going the wrong way, so that immediate emergency intervention may be summoned.

The above-described systems and method may accordingly help bring to the attention of the wrong way driver that he/she is going the wrong way and turn around, stop, or get out of the way of right way drivers exiting the ramp, instead of continuing to drive the wrong way on the exit ramp and/or continue to drive all the way to the mainline facing right way vehicles head on. This may correct the wrong way driving behavior, and thereby save lives by avoiding wrong way crashes on exit ramps, mainlines, limited access highways and other high speed roads. These wrong way crashes often result in a high rate of fatalities, severe incapacitating injuries that lead to life time disabilities, intense damage to public and private property, and economic losses to public and private agencies due to significant time loss in congestion of the road where the crash occurred, or finding an alternative road to travel, while such crashes are being cleared.

It should also be noted that the above-described systems may be used in other locations besides off ramps or on the roadside of a mainline highway. For example, the systems and methods described herein may be used in the medians of mainline roads to detect when unauthorized personnel use the median to impermissibly turn around (e.g., use of a median which is for authorized personnel only). Another location at which the above-described approaches may be used are at traffic lights or other intersections, as well as on divided highways.

Figure 9:
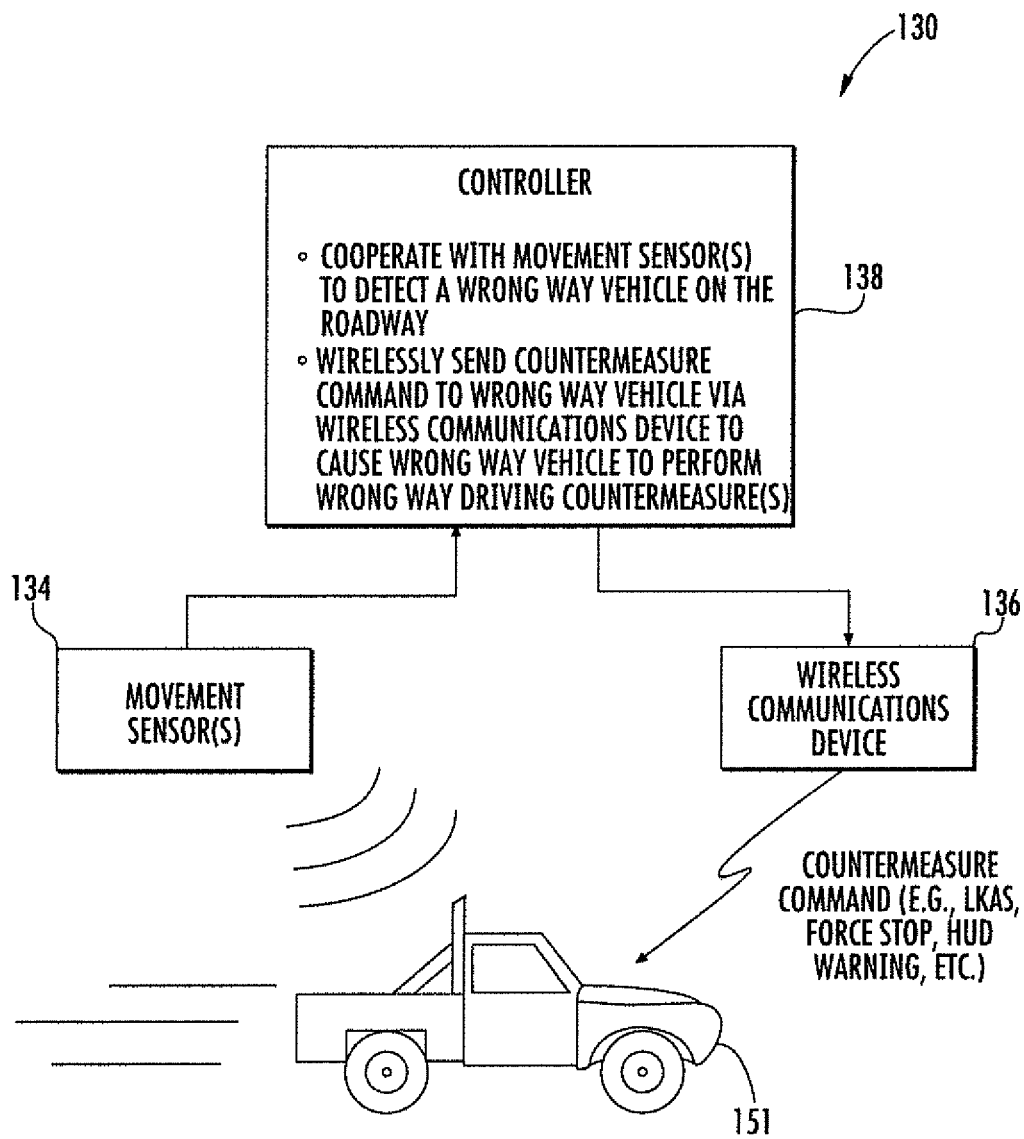
FIG. 9 is a schematic block diagram of a wrong way vehicle countermeasure system in accordance with an example embodiment.
Figure 10:
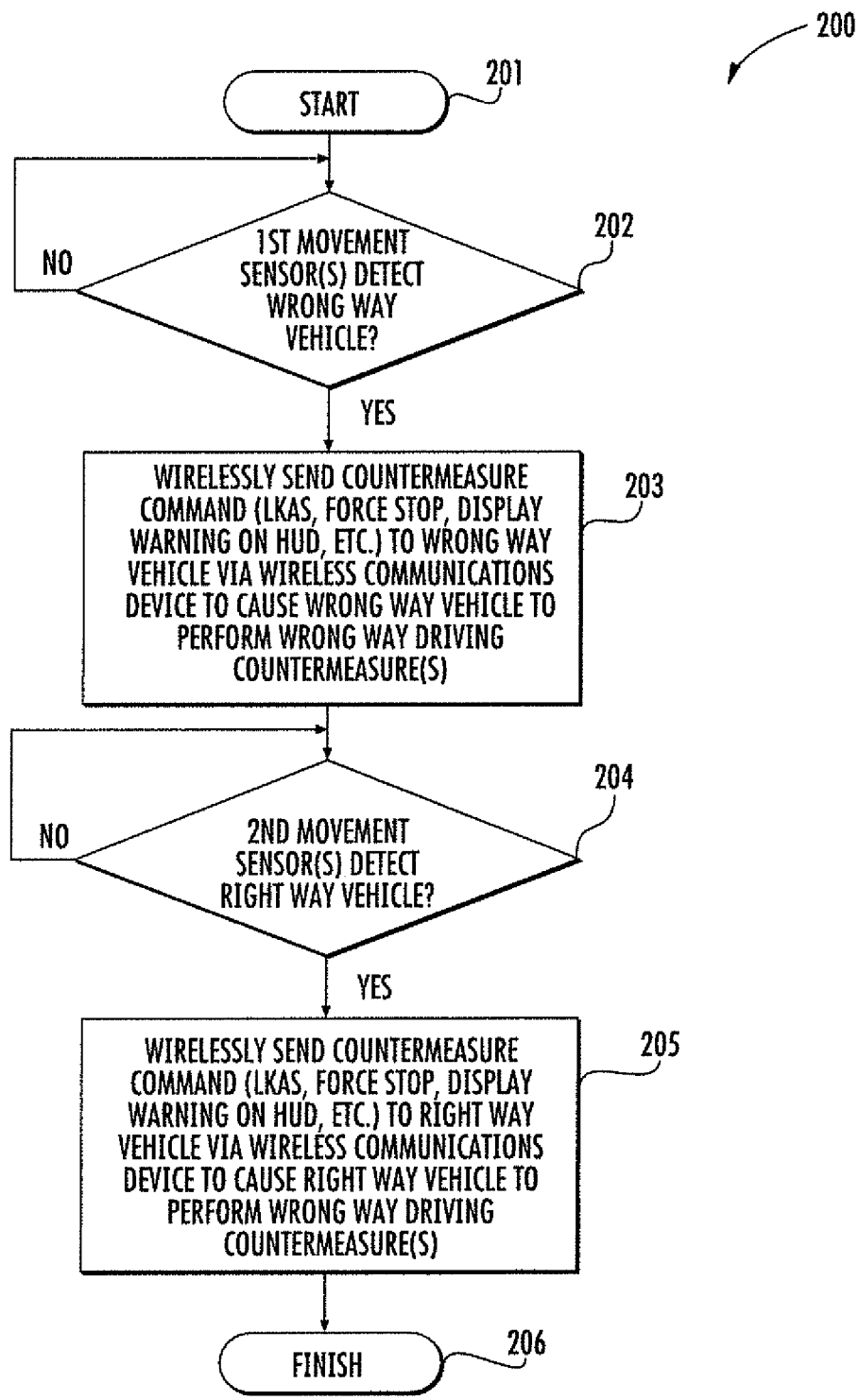
FIG. 10 is a flow diagram illustrating method aspects associated with the system of FIG. 9.
Figure 11:
FIG. 11 is a front view of a heads-up display which may be used for providing wrong way vehicle warnings in accordance with an example embodiment.
Figure 12:
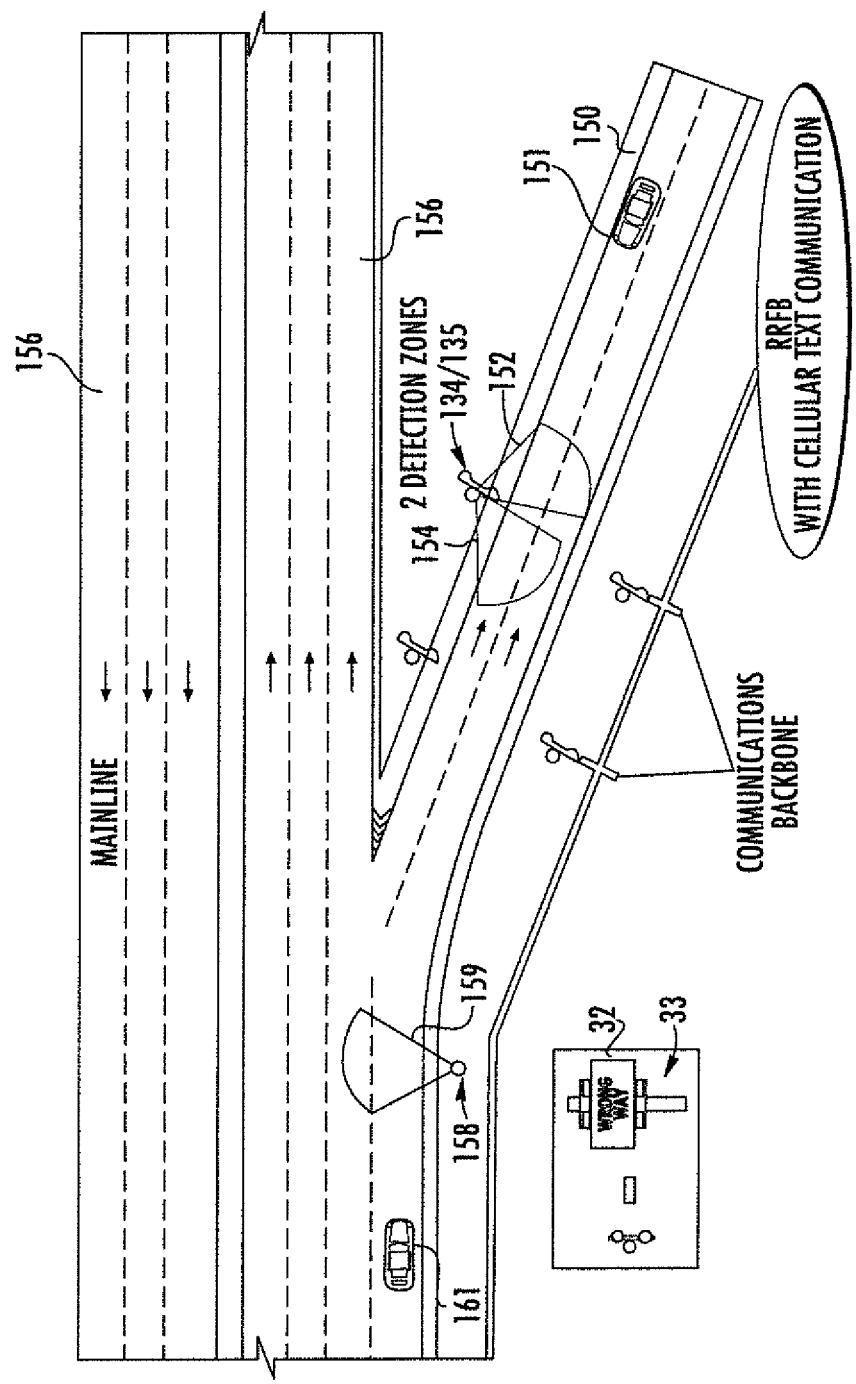
FIGS. 12-20 are a series of diagrams illustrating a wrong way driving scenario in which countermeasures are applied in accordance with an example embodiment.
Figure 13:
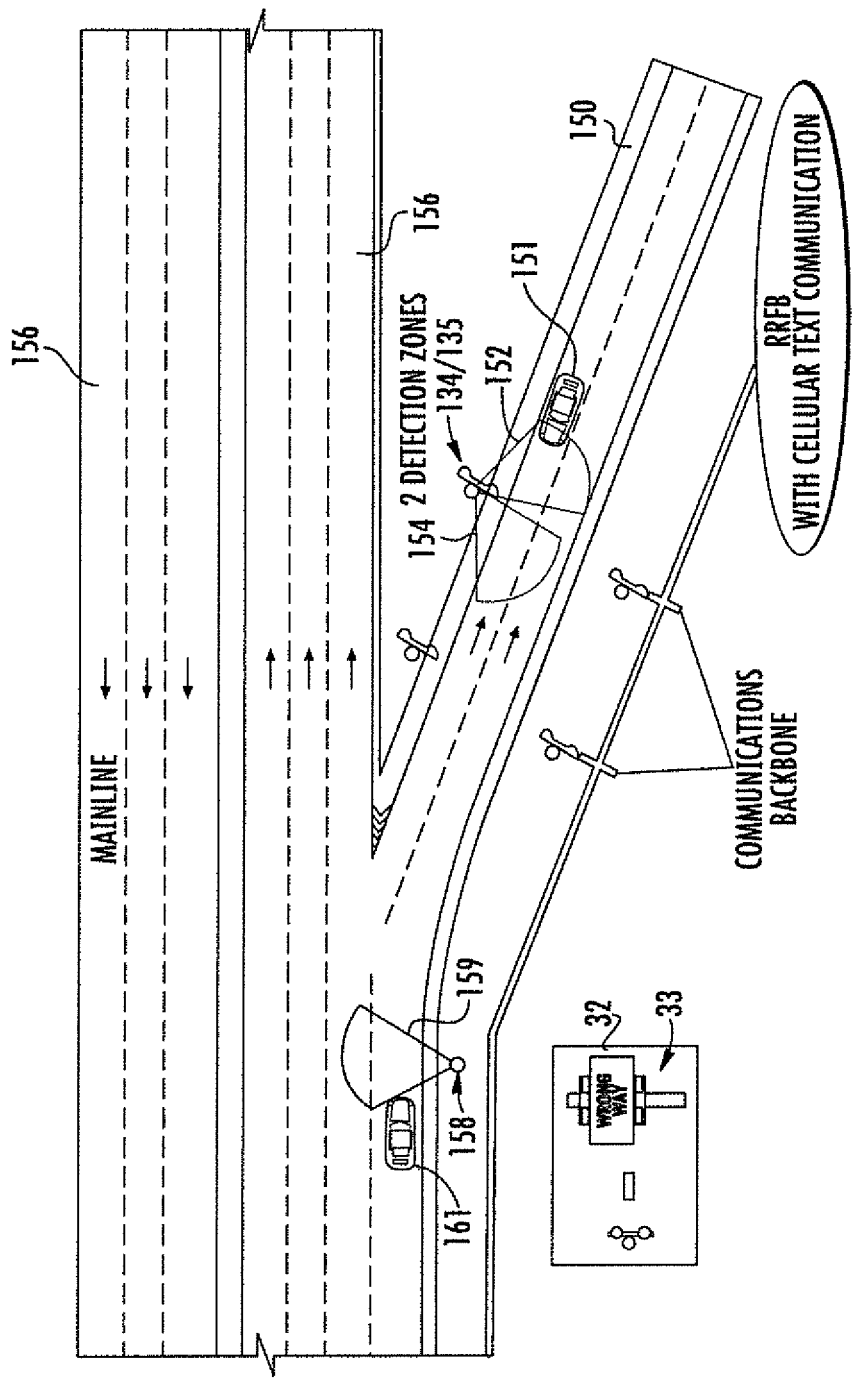
Figure 14:
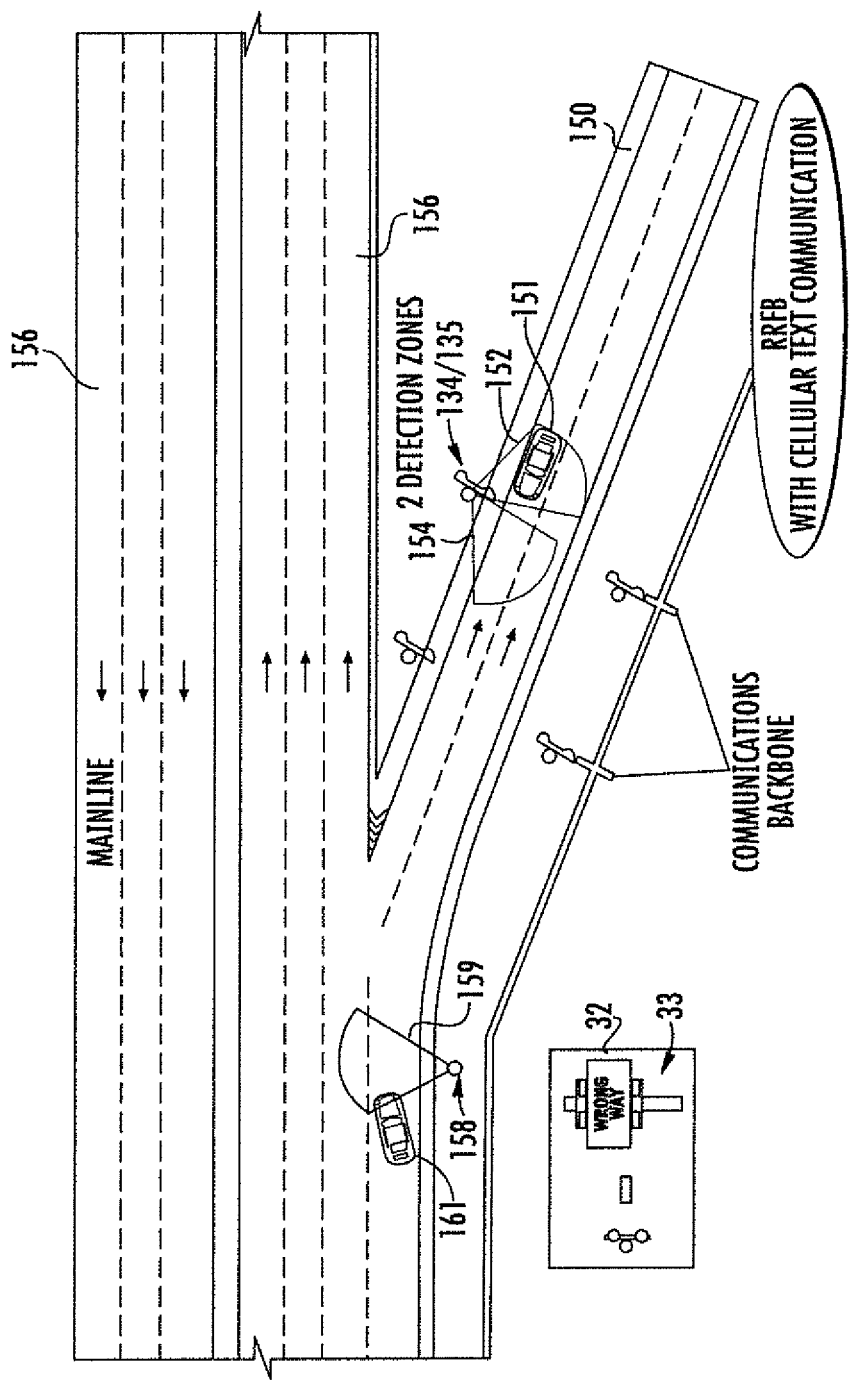
Figure 15:
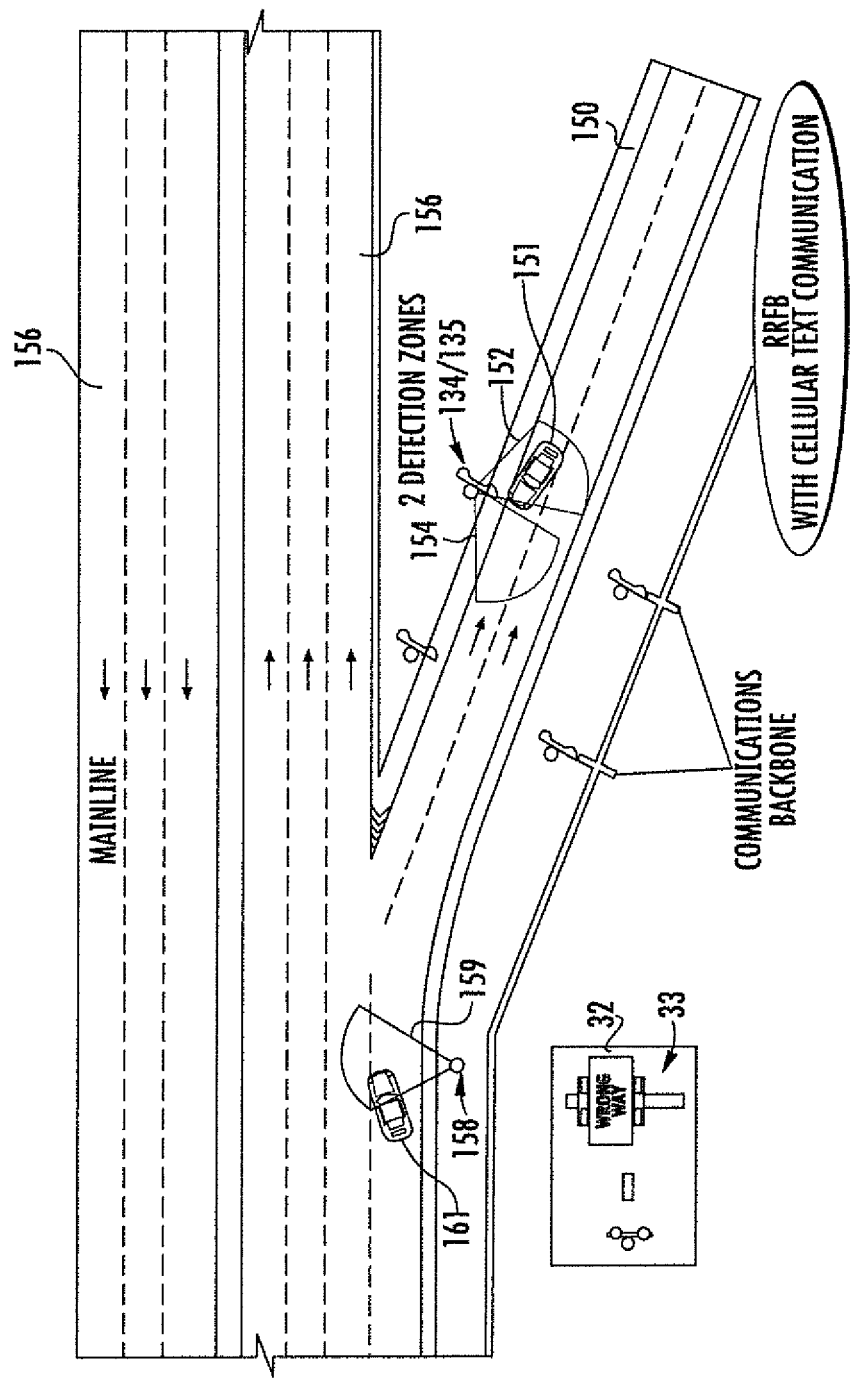
Figure 16:
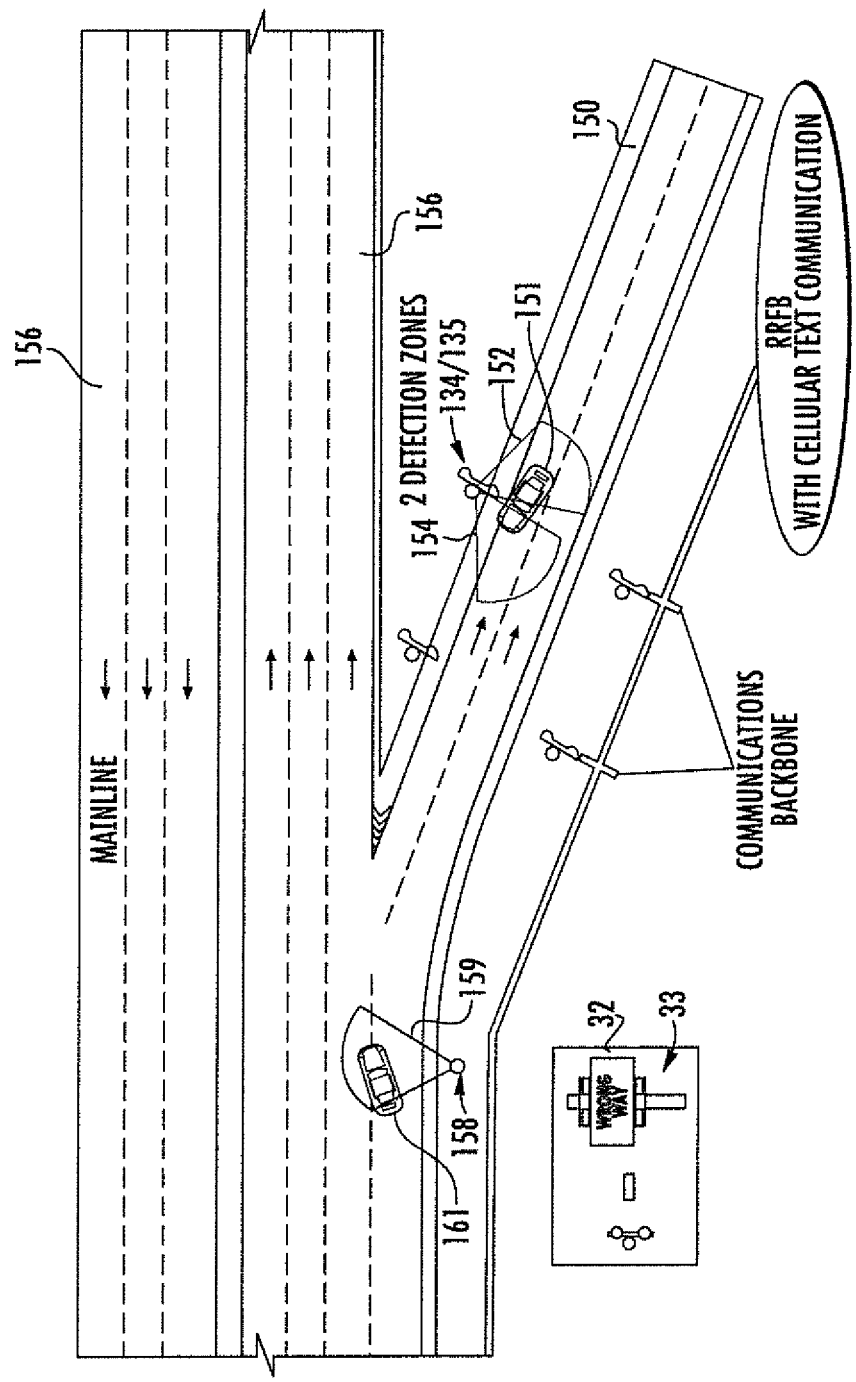
Figure 17:
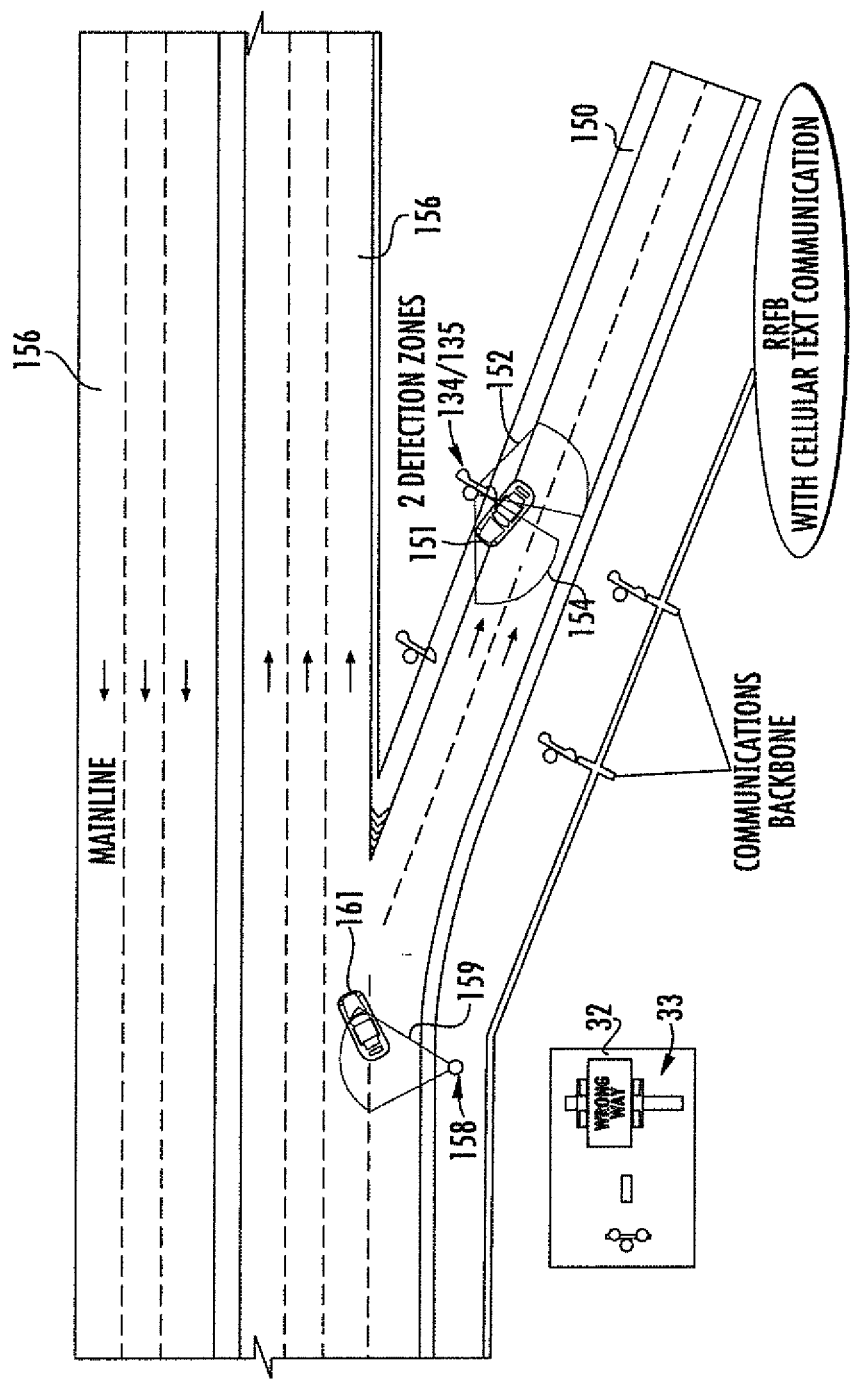
Figure 18:
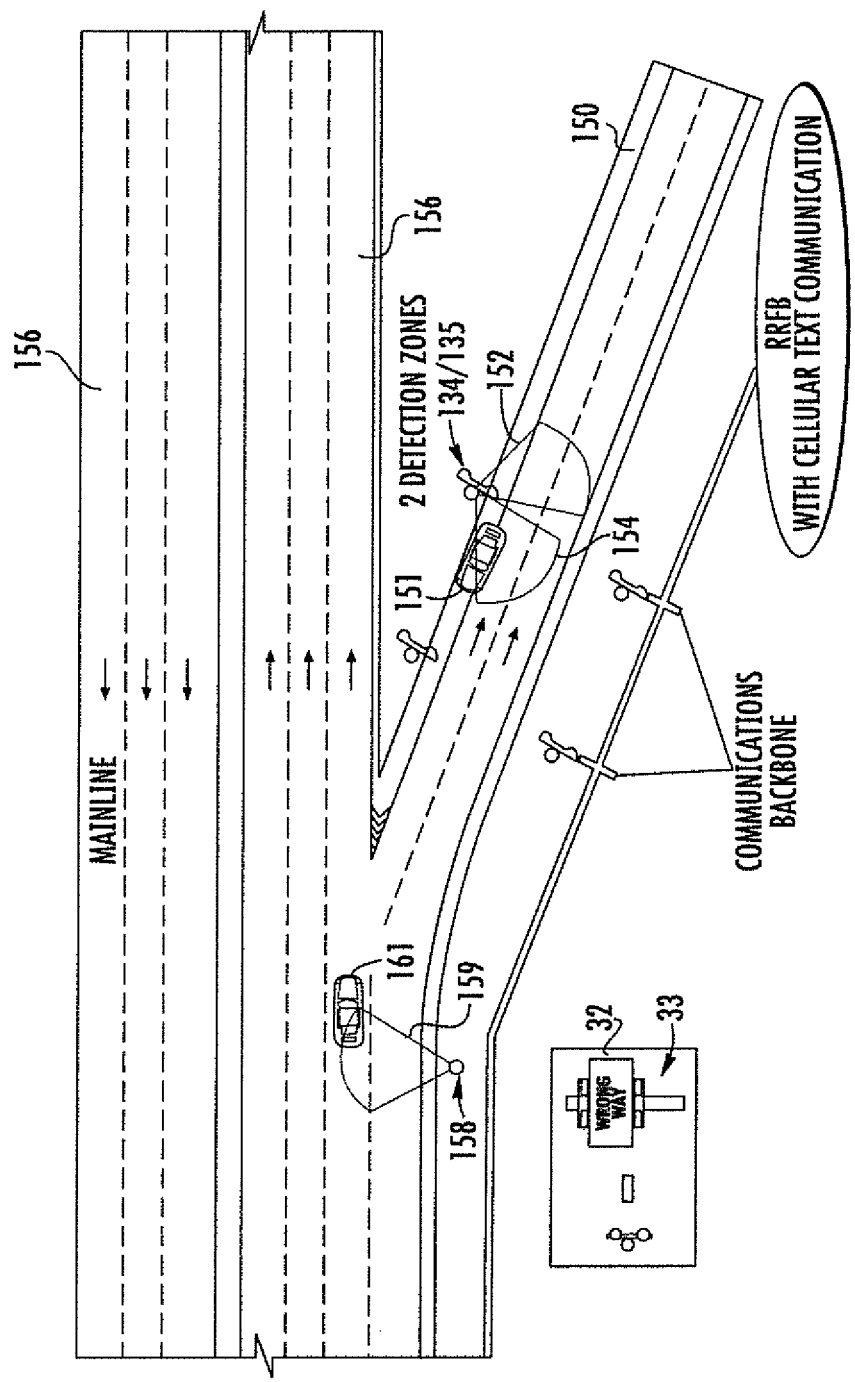
Figure 19:
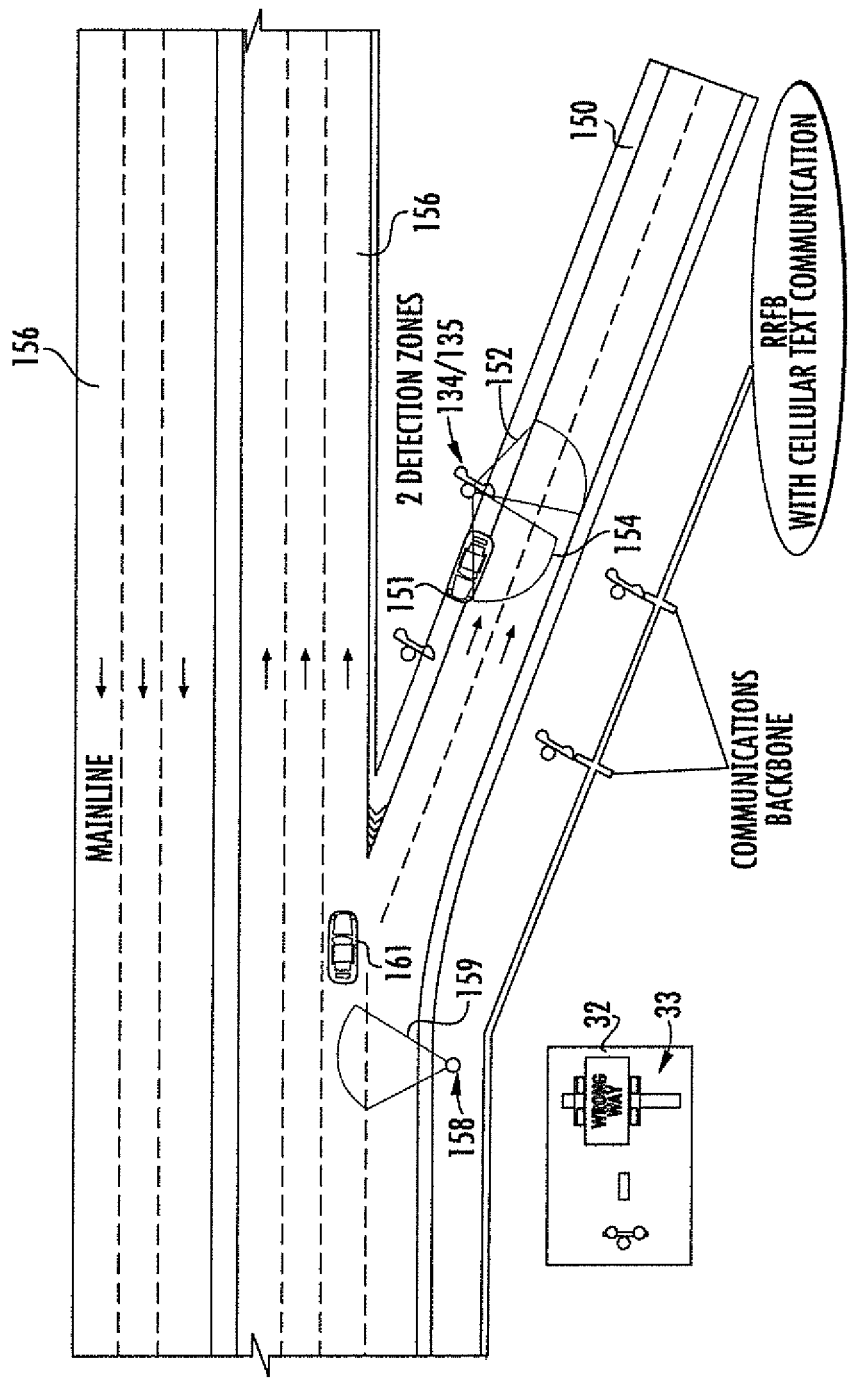
Figure 20:
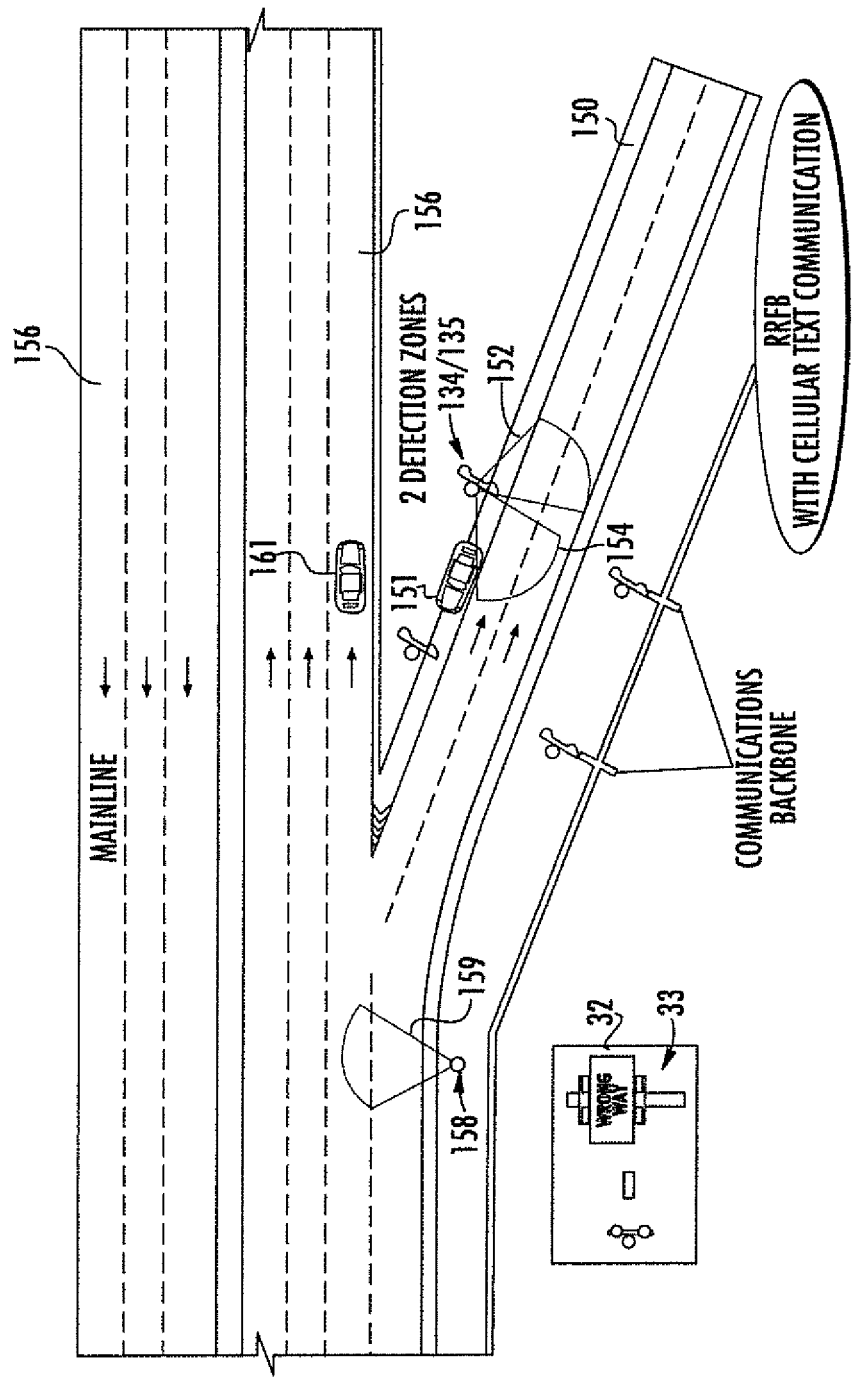

Turning to the FIGS. 9-11, an example wrong way vehicle countermeasure system 30 in which the above-described configurations may be used to advantageously leverage technology in connected vehicles, such as for remotely controlling steering and stopping of vehicles, to stop wrong way drivers before they reach the mainline is now described, and optionally notify wrong way drivers as well as right way divers driving connected vehicles on the mainline. As noted above, the wrong-way driving detection technology may be installed at mainline exit ramps (or other locations along a roadway or intersection). It should be noted that not all of the above-described warning station components need to be used in all of the following (e.g., cameras, etc.).

Generally speaking, the present approach may utilize roadside wrong way driver detection/warning stations, such as those described above, along with in-vehicle technologies such as heads up displays (HUDs) and Lane Keeping Assist System (LKAS) technologies, to prevent wrong-way drivers from entering a mainline or other roadway.

Beginning at Block 201 of the flow diagram 200, the system 130 illustratively includes one or more movement sensors 134 positioned along a roadway, and a wireless communications device 136. Here again, a configuration may be used similar to that of the front and rear facing sensors 34, 35 described above, although in some embodiments a single senor (or more than two sensors) may be used. Also, the wireless communications device 136 may utilize various communications formats, such as WiFi, cellular, Bluetooth®, or other suitable formats.

The system 130 further illustratively includes a controller 138 configured to cooperate with the movement sensor(s) to detect a wrong way vehicle 151 on the roadway, at Block 202, and responsive to the detection of the wrong way vehicle on the roadway by the movement sensor, wirelessly send a countermeasure command to the wrong way vehicle via the wireless communications device 136 to cause the wrong way vehicle to perform at least one wrong way driving countermeasure, at Block 203.

By way of example, the wrong way vehicle 151 may include a Lane Keeping Assist System (LKAS), and the countermeasure command may be an LKAS command to steer the wrong way vehicle to the side of the roadway. In accordance with another example, the wrong way vehicle 151 may include a braking system, and the countermeasure command may be a force stop command to cause the wrong way vehicle to actuate the braking system. In still another example embodiment, the vehicle 151 may include a Heads-Up Display (HUD) 160 (FIG. 11), and the countermeasure command may be a display warning command to cause the HUD to display a wrong way driving warning message. In the illustrated example, the warning message instructs the driver he or she is going the wrong way and to turn around now, and also presents a stop sign symbol. Other wording or messages (including flashing or animated text or symbols) may also be used when sending messages to the HUD 160.

Referring additionally to FIGS. 12-20, an example embodiment is now described where forward facing and rear facing movement sensors 134, 135 defining respective detection zones 152, 154 are positioned along an off ramp 150 of a mainline roadway 156 (e.g., a highway or freeway) to detect movement of the wrong way vehicle 151 along the off ramp. Moreover, another movement sensor 158 defining a detection zone 159 is positioned along the mainline roadway 156 before the off ramp 150. As such, the controller 138 (which may be implemented in one or more pieces and located on-site and/or remote) may be further configured to cooperate with the movement sensor 158 to detect a right way vehicle 161 approaching the off ramp 150 along the mainline roadway 156 (Block 204) and, responsive thereto, wirelessly send a countermeasure command to the right way vehicle to cause the right way vehicle to also perform one or more wrong way driving countermeasures, at Block 205, which concludes the method illustrated in FIG. 10 (Block 206). In the illustrated example, the wrong way vehicle 151 is forced to pull off the road (via an LKAS command) and stop (via a force stop command). Similarly, the system 130 may optionally cause the right way vehicle 161 to change lanes to move away from the off ramp 150. Accordingly, if the wrong way vehicle 151 was not stopped for some reason, the right way vehicle 161 may still avoid a crash. Different types and combinations of countermeasures may be used in different applications, including a warning to the HUD 160, a driver mobile device.

It should be noted that steps illustrated in Blocks 204-205 are optional and need not be performed in all embodiments. Moreover, in some embodiments, the wrong way countermeasures may be performed solely by the right way vehicle 161 and not by the wrong way vehicle 151 (e.g., the wrong way vehicle does not have connected vehicle technology as described above, but the right way vehicle does).

In accordance with one example embodiment having two sets of warning sign devices (such as RRFBs), the first set would detect and send a signal to the vehicle 151 with a warning message displaying on the HUD, giving the driver a chance to slow down, correct, and stop the vehicle. If no action is taken by the driver, for a certain distance (say "x feet"), then the second set of RRFBs may send a signal to use LKAS, thus steering the vehicle 151 to the shoulder and applying the brake, stopping the vehicle at the shoulder of the ramp. LKAS would be able to steer the wheel of the vehicle 151 to the shoulder without any external disturbances (although if steering control was not available vehicle braking could alternatively be used to just stop the vehicle where it is on the exit ramp). Using this approach may allow for stopping or confinement of wrong way drivers using systems already present in some modern day vehicles (e.g., LKAS and HUD already exist in Mercedes cars).

Furthermore, should the second set of warning devices activate it may also send a message to vehicles 161 traveling the correct way in the nearby vicinity to alert them of a wrong way driving vehicle. Moreover, in addition to (or instead of) warning drivers driving the right way of a wrong way driver, a lane adjustment and for autonomous vehicles and/or slow down may also be implemented in the vehicles 161 going the right way based on the signal from the WWD detector. That is, right way vehicles 161 may automatically be slowed and/or steered out of the path of the wrong way driver (and/or warned) using the above-described autonomous vehicle control techniques to help further mitigate against the chance of a wrong way collision.

Once the countermeasures have been applied to the wrong way vehicle 151, various scenarios may occur. One is that a wrong-way driver who corrects his or her wrong way driving act and turns around and goes the right way, which may be monitored and verified using the sensors 134, 135, as discussed above. Another possibility is that the wrong-way driver continues to drive (or attempt to drive) the wrong way and does not correct his or her wrong-way driving act, in which case law enforcement may be summoned to intervene.

The RRFB sign and detection system (or other suitable wrong way detection infrastructure) may communicate with connected vehicles upon detection of a wrong way vehicle. The LKAS and the HUD are ways to alert the wrong way driver to correct his or her wrong act first, and if it does not work, the LKAS may steer the wrong way vehicle off the road and apply breaks to stop it. Furthermore, if the driver insists on driving further then police may be notified to apprehend the wrong way driver. At the same time, and if the wrong way driver does not correct his or her wrong way driving act, then right way drivers may be notified about the wrong way driver via connected vehicles displays, etc., and possible other notification devices including but not limited to Dynamic Message Signs (DMS) discussed above. Another benefit of the above-described approach is to reduce unnecessary messages on DMS signs alerting the public of wrong way drivers and creating problems when this is not warranted.

With respect to intentional wrong way drivers, such drivers may be less likely to respond to traditional warnings against wrong way driving at exit ramps, etc. However, the present approaches may advantageously address these types of difficult cases (suicidal and intentional wrong way drivers). Connected vehicles and wrong way driving infrastructure may be deployed (or updated where already deployed) to perform the wrong way vehicle disabling and warning features described herein. For example, there is already wide spread use of warning beacons and LED flashing signs at exit ramps of limited access highways (toll roads and freeways) and high speed roads in the US where there is potential for wrong way driving events to occur.

The above-described "force stop" approach may be used to stop drivers who have the potential to keep traveling the wrong way from the ramp and to the mainline. Bringing the vehicle to a stop by being able to integrate LKAS and the brakes along with HUD and RRFB infrastructure, allows the vehicle to be brought to the shoulder of the ramp before entering the mainline. Moreover, the above-described approaches, which may advantageously combine detection, alerting, and stopping of the wrong-way vehicle, may help prevent wrong-way drivers from entering the mainline without the need for physical countermeasures (e.g., police chase, tire spikes, etc.) and their associated consequences.

A related non-transitory computer-readable medium is for a computer (e.g., the above-described controller 138, which may be implemented using a microprocessor and associated hardware) for use with one or more movement sensors 134 positioned along a roadway and a wireless communications device 136. The non-transitory computer-readable medium may have computer-executable instructions for causing the computer to perform steps including operating the movement sensor 134 to detect a wrong way vehicle 151 on the roadway, and responsive to the detection of the wrong way vehicle on the roadway by the movement sensor, wirelessly sending a countermeasure command to the wrong way vehicle via the wireless communications device 136 to cause the wrong way vehicle to perform at least one wrong way driving countermeasure.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A wrong way vehicle countermeasure system comprising:
    a first movement sensor positioned along an off ramp of a mainline roadway to detect movement of a wrong way vehicle along the off ramp;
    a second movement sensor positioned along the mainline roadway before the off ramp;
    a wireless communications device; and
    a controller configured to
        cooperate with the first and second movement sensors to detect a wrong way vehicle on the off ramp and about to enter the roadway, and
        responsive to the detection of the wrong way vehicle on the off ramp and about to enter the roadway, wirelessly send a countermeasure command to the wrong way vehicle via the wireless communications device to control the wrong way vehicle to perform at least one wrong way driving countermeasure before entering the roadway.

2. The system of claim 1 wherein the wrong way vehicle comprises a Lane Keeping Assist System (LKAS), and wherein the countermeasure command comprises an LKAS command to steer the wrong way vehicle to the side of the roadway.

3. The system of claim 1 wherein the wrong way vehicle comprises a braking system, and wherein the countermeasure command comprises a force stop command to control the wrong way vehicle to actuate the braking system.

4. The system of claim 1 wherein the vehicle comprises a Heads-Up Display (HUD), and wherein the countermeasure command comprises a display warning command to control the HUD to display a wrong way driving warning message.

5. The system of claim 1 wherein
    the controller is further configured to wirelessly send a countermeasure command to a right way vehicle approaching the off ramp along the mainline roadway and to cause the right way vehicle to also perform at least one wrong way driving countermeasure.

6. The system of claim 1 further comprising:
    a wrong way indication sign facing away from a direction of oncoming traffic on the roadway, with the first movement sensor being adjacent the wrong way indication sign; and
    at least one beacon adjacent the wrong way indication sign;
    wherein the controller is configured to cause the at least one beacon to flash responsive to the detection of the wrong way vehicle by the first movement sensor.

7. The system of claim 6 wherein the at least one beacon comprises an upper pair of flashing beacons above the wrong way indication sign, and a lower pair of flashing beacons positioned below the wrong way indication sign.

8. A wrong way vehicle countermeasure method for use with a first movement sensor positioned along an off ramp of a mainline roadway to detect movement of the wrong way vehicle along the off ramp, a second movement sensor positioned along the mainline roadway before the off ramp, and a wireless communications device, the method comprising:
    cooperating with the first and second movement sensors to detect a wrong way vehicle on the off ramp and about to enter the roadway; and
    responsive to the detection of the wrong way vehicle on the off ramp and about to enter the roadway, wirelessly sending a countermeasure command to the wrong way vehicle via the wireless communications device to control the wrong way vehicle to perform at least one wrong way driving countermeasure before entering the roadway.

9. The method of claim 8 wherein the wrong way vehicle comprises a Lane Keeping Assist System (LKAS), and wherein the countermeasure command comprises an LKAS command to steer the wrong way vehicle to the side of the roadway.

10. The method of claim 8 wherein the wrong way vehicle comprises a braking system, and wherein the countermeasure command comprises a force stop command to control the wrong way vehicle to actuate the braking system.

11. The method of claim 8 wherein the vehicle comprises a Heads-Up Display (HUD), and wherein the countermeasure command comprises a display warning command to control the HUD to display a wrong way driving warning message.

12. The method of claim 8 further comprising:
wirelessly sending a countermeasure command to a right way vehicle approaching the off ramp via the wireless communications device to cause the right way vehicle to also perform at least one wrong way driving countermeasure.

13. The method of claim 8 wherein the first movement sensor is adjacent a wrong way indication sign facing away from a direction of oncoming traffic on the roadway with at least one beacon adjacent the wrong way indication sign; and further comprising causing the at least one beacon to flash responsive to the detection of the wrong way driver by the first movement sensor.

14. A non-transitory computer-readable medium for a computer for use with a first movement sensor positioned along an off ramp of a mainline roadway to detect movement of the wrong way vehicle along the off ramp, a second movement sensor positioned along the mainline roadway before the off ramp, and a wireless communications device, the non-transitory computer-readable medium having computer-executable instructions for causing the computer to perform steps comprising:
cooperating with the first and second movement sensors to detect a wrong way vehicle on the off ramp and about to enter the roadway; and
responsive to the detection of the wrong way vehicle on the off ramp and about to enter the roadway, wirelessly sending a countermeasure command to the wrong way vehicle via the wireless communications device to control the wrong way vehicle to perform at least one wrong way driving countermeasure before entering the roadway.

15. The non-transitory computer-readable medium of claim 14 wherein the wrong way vehicle comprises a Lane Keeping Assist System (LKAS), and wherein the countermeasure command comprises an LKAS command to steer the wrong way vehicle to the side of the roadway.

16. The non-transitory computer-readable medium of claim 14 wherein the wrong way vehicle comprises a braking system, and wherein the countermeasure command comprises a force stop command to control the wrong way vehicle to actuate the braking system.

17. The non-transitory computer-readable medium of claim 14 wherein the vehicle comprises a Heads-Up Display (HUD), and wherein the countermeasure command comprises a display warning command to control the HUD to display a wrong way driving warning message.

18. The non-transitory computer-readable medium of claim 14 further having computer-executable instructions for causing the computer to
wirelessly send a countermeasure command to a right way vehicle approaching the off ramp to cause the right way vehicle to also perform at least one wrong way driving countermeasure.

19. The non-transitory computer-readable medium of claim 14 wherein the first movement sensor is adjacent to a wrong way indication sign facing away from a direction of oncoming traffic on the roadway with at least one beacon adjacent the wrong way indication sign; and further having computer-executable instructions for causing the computer to cause the at least one beacon to flash responsive to the detection of the wrong way driver by the first movement sensor.

* * * * *

UNITED STATES PATENT AND TRADEMARK OFFICE
CERTIFICATE OF CORRECTION

PATENT NO. : 10,351,131 B2
APPLICATION NO. : 15/677501
DATED : July 16, 2019
INVENTOR(S) : Al-Deek et al.

Page 1 of 1

It is certified that error appears in the above-identified patent and that said Letters Patent is hereby corrected as shown below:

On the Title Page

Add (70) Assignee:
-- Central Florida Expressway Authority, Orlando, Florida --

Signed and Sealed this
Fifteenth Day of September, 2020

Andrei Iancu
*Director of the United States Patent and Trademark Office*